(12) United States Patent
Deilami et al.

(10) Patent No.: US 12,442,323 B2
(45) Date of Patent: *Oct. 14, 2025

(54) SYSTEMS AND METHODS FOR CONTROLLING A DOSING MODULE

(71) Applicant: Cummins Emission Solutions Inc., Columbus, IN (US)

(72) Inventors: Masoud Ziabakhsh Deilami, Columbus, IN (US); Joe V. Hill, Columbus, IN (US); Jens Honeck, Ahorn (DE); Ralf Rohrmueller, Faulbach (DE)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/970,558

(22) Filed: Dec. 5, 2024

(65) Prior Publication Data
US 2025/0092808 A1 Mar. 20, 2025

Related U.S. Application Data

(63) Continuation of application No. 18/673,920, filed on May 24, 2024, now Pat. No. 12,209,521.

(60) Provisional application No. 63/469,111, filed on May 26, 2023.

(51) Int. Cl.
*F01N 3/20* (2006.01)

(52) U.S. Cl.
CPC ........ *F01N 3/206* (2013.01); *F01N 2610/146* (2013.01); *F01N 2900/1808* (2013.01)

(58) Field of Classification Search
CPC .... F01N 2900/1808; F01N 3/208; F01N 9/00; F01N 2610/02; F01N 2610/144;
(Continued)

(56) References Cited

U.S. PATENT DOCUMENTS 7,188,040 B2 3/2007 Nagase
7,287,699 B2 10/2007 Liu
(Continued)

FOREIGN PATENT DOCUMENTS

GB 2 589 150 5/2021
JP 4505766 B2 7/2010
(Continued)

OTHER PUBLICATIONS

Extended European Search Report in European Patent Application No. 24177994.1 issued Aug. 1, 2024.

*Primary Examiner* — Anthony Ayala Delgado
(74) *Attorney, Agent, or Firm* — Foley & Lardner LLP

(57) ABSTRACT

A controller for an exhaust aftertreatment system receives a pressure signal from a pressure sensor. The pressure sensor generates the pressure signal based on a pressure of treatment fluid in a downstream dosing module. The controller further determines a pressure measurement based on the pressure signal, determines a first injection amount based on the pressure measurement, and causes an upstream injector of an upstream dosing module to inject the treatment fluid according to the first injection amount. The controller further determines a second injection amount based on the pressure measurement and a resistance of a variable resistor and causes a downstream injector of a downstream dosing module to inject the treatment fluid according to the second injection amount.

20 Claims, 12 Drawing Sheets

(58) Field of Classification Search
CPC ....... F01N 2610/146; F01N 2610/1473; F01N 3/2066; F01N 11/002; F01N 2410/00; F01N 2610/03; F01N 2900/0408; F01N 2900/0414; F01N 2900/08; F01N 2900/14; F01N 2900/1404; F01N 2900/1411; F01N 2900/1812; F01N 2900/1822; F01N 3/0253; F01N 3/035; F01N 3/206; F01N 3/24; F01N 3/28; F01N 2570/14; F01N 3/2073

See application file for complete search history.

(56) References Cited

U.S. PATENT DOCUMENTS

| | | | |
|---|---|---|---|
| 8,635,862 B2* | 1/2014 | Gonze | F01N 11/002 60/284 |
| 9,765,674 B2* | 9/2017 | Khaled | B01D 53/9418 |
| 9,822,686 B2 | 11/2017 | Liljestrand | |
| 10,301,996 B2 | 5/2019 | Zapf et al. | |
| 11,639,680 B2* | 5/2023 | Kamei | F01N 3/208 60/299 |
| 11,965,447 B2* | 4/2024 | Christl | B01D 53/9495 |
| 2004/0095225 A1 | 5/2004 | Nelson | |
| 2008/0264043 A1 | 10/2008 | Kawakita et al. | |
| 2012/0230132 A1 | 9/2012 | Soma | |
| 2017/0089243 A1 | 3/2017 | Schmitt et al. | |
| 2022/0251988 A1* | 8/2022 | Kamei | B01D 53/9495 |

FOREIGN PATENT DOCUMENTS

| | | |
|---|---|---|
| WO | WO-01/43999 A1 | 6/2001 |
| WO | WO-2019/141490 A1 | 7/2019 |
| WO | WO-2019/226174 A1 | 11/2019 |

* cited by examiner

SYSTEMS AND METHODS FOR CONTROLLING A DOSING MODULE

CROSS-REFERENCE TO RELATED APPLICATION

This application is a continuation of U.S. patent application Ser. No. 18/673,920, filed May 24, 2024, which claims the benefit of U.S. Provisional Patent Application No. 63/469,111, filed May 26, 2023, both of which are incorporated herein by reference in their entirety.

TECHNICAL FIELD

The present disclosure relates generally to exhaust aftertreatment systems of internal combustion engines.

BACKGROUND

The exhaust of internal combustion engines, such as diesel engines, includes nitrogen oxide ($NO_x$) compounds. It is desirable to reduce $NO_x$ emissions, for example, to comply with environmental regulations. To reduce $NO_x$ emissions, a treatment fluid may be dosed into the exhaust by one or more dosing modules within an exhaust aftertreatment system. The treatment fluid facilitates conversion of a portion of the exhaust into non-$NO_x$ emissions, such as nitrogen ($N_2$), carbon dioxide ($CO_2$), and water ($H_2O$), thereby reducing $NO_x$ emissions. The one or more dosing modules may be communicably coupled to a controller that controls dosing of the one or more dosing modules. The controller may be configured to receive a pressure signal from one of the one or more dosing modules and control the one or more dosing modules based on the pressure signal.

SUMMARY

In one embodiment, an exhaust aftertreatment system including a first decomposition chamber that receives exhaust and treatment fluid, a first dosing module that includes a first injector that injects the treatment fluid into the first decomposition chamber, and a second decomposition chamber disposed downstream of the first decomposition chamber and that receives the exhaust and the treatment fluid from the first decomposition chamber. The exhaust aftertreatment system further includes a second dosing module that includes a second injector that injects the treatment fluid into the second decomposition chamber and a pressure sensor that generates a pressure signal based on a pressure of the treatment fluid in the second dosing module. The exhaust aftertreatment system further includes a variable resistor selectively switchable between multiple resistances. The exhaust aftertreatment system further includes a controller electrically coupled to the first dosing module, the second dosing module, and the variable resistor. The controller receives the pressure signal from the pressure sensor, determines a pressure measurement based on the pressure signal, determines a first injection amount based on the pressure measurement, causes the first injector to inject the treatment fluid according to the first injection amount, determines a second injection amount based on the pressure measurement and the resistance of the variable resistor, and causes the second injector to inject the treatment fluid according to the second injection amount.

In some embodiments, the controller receives an electrical charge from the variable resistor and determines the resistance of the variable resistor based on the electrical charge.

In some embodiments, the controller determines an electrical current of the electrical charge, retrieves a fixed voltage value, and determines the resistance of the variable resistor based on the electrical current and the fixed voltage value.

In some embodiments, the fixed voltage value is a voltage amount used by the variable resistor.

In some embodiments, the pressure sensor includes a sensing element that provides a pressure voltage based on the pressure of the treatment fluid in the second dosing module. The pressure sensor further includes a signal conditioner electrically coupled to the sensing element and that receives the pressure voltage from the sensing element and output the pressure signal.

In some embodiments, the variable resistor is a first variable resistor. The exhaust aftertreatment system further includes a second variable resistor selectively switchable between multiple resistances. The controller determines the first injection amount based on the pressure measurement and the resistance of the second variable resistor.

In another embodiment, an exhaust aftertreatment system includes a first decomposition chamber that receives exhaust and treatment fluid, a first dosing module that includes a first injector that injects the treatment fluid into the first decomposition chamber, and a second decomposition chamber disposed downstream of the first decomposition chamber and that receives the exhaust and the treatment fluid from the first decomposition chamber. The exhaust aftertreatment system further includes a second dosing module that includes a second injector that injects the treatment fluid into the second decomposition chamber and a pressure sensor. The pressure sensor includes a sensing element that provides a pressure voltage based on a pressure of the treatment fluid in the second dosing module and a first signal conditioner electrically coupled to the sensing element and that receives the pressure voltage from the sensing element and output a pressure signal. The pressure sensor further includes a second signal conditioner electrically coupled to the sensing element and that receives the pressure voltage from the sensing element, determines a trim calibration value based on a trim calibration function and the pressure voltage, and outputs a trimmed pressure signal. The trimmed pressure signal is determined based on the pressure voltage and the trim calibration value. The exhaust aftertreatment system further includes a controller electrically coupled to the first dosing module, the second dosing module, and the pressure sensor. The controller receives the pressure signal and the trimmed pressure signal from the pressure sensor, determines a pressure measurement based on the pressure signal, determines a first injection amount based on the pressure measurement, causes the first injector to inject the treatment fluid according to the first injection amount, determines a trimmed pressure measurement based on the trimmed pressure signal, determines a second injection amount based on the trimmed pressure measurement, and causes the second injector to inject the treatment fluid according to the second injection amount.

In yet another embodiment, an exhaust aftertreatment system includes a first decomposition chamber that receives exhaust and treatment fluid, a first dosing module that includes a first injector that injects the treatment fluid into the first decomposition chamber, and a second decomposition chamber disposed downstream of the first decomposition chamber. The second decomposition chamber receives the exhaust and the treatment fluid from the first decomposition chamber. The exhaust aftertreatment system further includes a second dosing module that includes a second injector that injects the treatment fluid into the second decomposition chamber and a pressure sensor that generates a pressure voltage based on a pressure of the treatment fluid in the second dosing module and provide a pressure signal based on the pressure voltage. The exhaust aftertreatment system further includes a controller electrically coupled to the first dosing module, the second dosing module, and the pressure sensor. The controller receives the pressure signal from the pressure sensor, determines a pressure measurement based on the pressure signal, determines a first injection amount based on the pressure measurement, causes the first injector to inject the treatment fluid according to the first injection amount, receives the pressure voltage from the pressure sensor, determines a trim calibration value based on a trim calibration function and the pressure voltage, determines a second injection amount based on the pressure measurement and the trim calibration value, and causes the second injector to inject the treatment fluid according to the second injection amount.

In some embodiments, the pressure sensor includes a sensing element that provides the pressure voltage based on the pressure of the treatment fluid in the second dosing module. The pressure sensor further includes a signal conditioner electrically coupled to the sensing element and that receives the pressure voltage from the sensing element and output the pressure signal.

In some embodiments, the controller includes a memory and the controller receives at least one of the pressure voltage or the pressure signal from the pressure sensor after the trim calibration function is stored in the memory.

In some embodiments, the controller receives the trim calibration function from the pressure sensor.

In some embodiments, the controller receives the trim calibration function from the pressure sensor after the pressure sensor is powered on.

In some embodiments, after the pressure sensor is powered on, the controller receives, from the pressure sensor, a first trim function value voltage for a first time period and determines a first trim function value based on the first trim function value voltage.

In some embodiments, after the pressure sensor is powered on, the controller receives, from the pressure sensor, a second trim function value voltage for a second time period after the first time period and determines a second trim function value based on the second trim function value voltage.

In some embodiments, the first trim function value is equal to an offset value of the trim calibration function and the second trim function value is equal to a slope value of the trim calibration function.

In some embodiments, the controller receives the pressure signal from the pressure sensor after the second time period.

In some embodiments, the controller determines raw pressure data based on the pressure voltage. Determining the pressure measurement includes filtering, by the controller, the raw pressure data.

In some embodiments, the raw pressure data includes the pressure measurement and a modulated trim. Filtering the raw pressure data includes removing, by the controller, the modulated trim from the raw pressure data.

In some embodiments, the filtering is performed using a first order discrete time first order filter.

In some embodiments, the controller determines raw pressure data based on the pressure voltage. Determining the trim calibration value includes demodulating, by the controller, the raw pressure data.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

Figure 1:
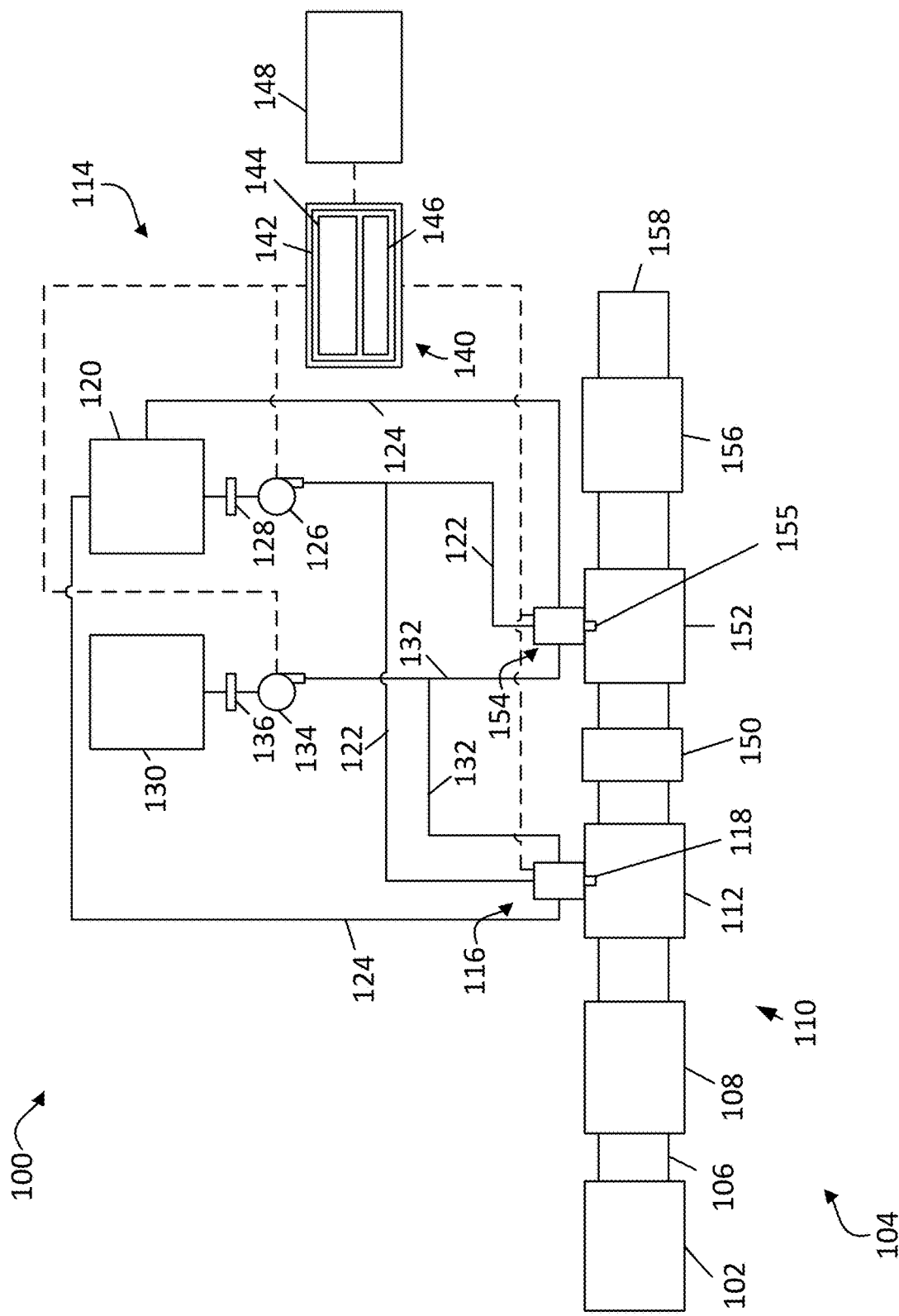
FIG. 1 is a block schematic diagram of an example exhaust aftertreatment system including a first dosing module, a second dosing module, and a controller.

It will be recognized that the Figures are schematic representations for purposes of illustration. The Figures are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and systems for controlling one or more dosing modules of an exhaust aftertreatment system for an internal combustion engine. The various concepts introduced above and discussed in greater detail below may be implemented in any of a number of ways, as the described concepts are not limited to any particular manner of implementation. Examples of specific implementations and applications are provided primarily for illustrative purposes.

I. Overview

To reduce emissions and increase efficiency of an internal combustion engine, it may be desirable to increase dosing accuracy of a dosing module (e.g., a doser) of an exhaust aftertreatment system. The dosing accuracy may be defined as a comparison between a treatment fluid injection amount injected by an injector of the dosing module and an ideal treatment fluid injection amount of the injector, where the ideal treatment fluid injection amount is associated with an amount of treatment fluid or treatment fluid-air mixture corresponding to a maximum $NO_x$ conversion efficiency.

Implementations herein are related to an exhaust aftertreatment system that facilitates improved dosing accuracy of a dosing module. In some embodiments, the exhaust aftertreatment system facilitates improved accuracy of multiple dosing modules. (e.g., both a first dosing module and a second dosing module). In some implementations, the dosing accuracy of the dosing module may be increased by calibrating the dosing module. However, where more than one dosing module is included (e.g., the first dosing module and the second dosing module), calibration of the second dosing module may result in an increase in dosing accuracy of the second dosing module but a decrease in dosing accuracy of the first dosing module, or vice versa.

In some implementations, a controller of the exhaust aftertreatment system is configured to determine a pressure measurement based on a pressure signal from a pressure sensor of the second dosing module, determine a first injection amount based on at least the pressure measurement, and cause a first injector of the first dosing module to inject treatment fluid according to the first injection amount. The first injector is, thereby, controlled based on the pressure measurement. The exhaust aftertreatment system includes a first variable resistor electrically coupled to the controller and configured to provide multiple resistances. The controller is further configured to determine a second injection amount based on the pressure measurement and the resistance of the first variable resistor, and cause a second injector of the second dosing module to inject the treatment fluid according to the second injection amount. The second injector is, thereby, controlled based on the pressure measurement and the resistance of the first variable resistor, such that the resistance of the first variable resistor allows for calibration of the second dosing module without influencing the control of the first dosing module.

In some implementations, the pressure sensor includes a sensing element configured to provide a pressure voltage based on a pressure of the treatment fluid in the second dosing module. The pressure sensor further includes a first signal conditioner electrically coupled to the sensing element and configured to receive the pressure voltage from the sensing element and output the pressure signal (e.g., untrimmed pressure signal). The controller is configured to determine the pressure measurement (e.g., untrimmed pressure measurement) based on the pressure signal (e.g., the untrimmed pressure signal), determine a first injection amount based on at least the pressure measurement, and cause the first injector to inject the treatment fluid according to the first injection amount. The first injector is, thereby, controlled based on the pressure measurement. The pressure sensor further includes a second signal conditioner electrically coupled to the sensing element and configured to receive the pressure voltage from the sensing element, determine a trim calibration value based on a trim calibration function and the pressure voltage, and output a trimmed pressure signal determined based on the pressure voltage and the trim calibration value. The controller is further configured to determine a trimmed pressure measurement based on the trimmed pressure signal from the second signal conditioner, determine a second injection amount based on the trimmed pressure measurement, and cause the second injector to inject the treatment fluid according to the second injection amount. The second injector is, thereby, controlled based on the trimmed pressure measurement, such that the trimmed pressure measurement allows for calibration of the second dosing module without influencing the control of the first dosing module.

In some implementations, the controller is configured to determine the pressure measurement based on the pressure signal from the pressure sensor, determine the first injection amount based on at least the pressure measurement, and cause the first injector to inject treatment fluid according to the first injection amount. The first injector is, thereby, controlled based on the pressure measurement. The controller is further configured to receive the pressure voltage from the pressure sensor, determine the trim calibration value based on the trim calibration function and the pressure voltage, determine the second injection amount based on the pressure measurement and the trim calibration value, and cause the second injector to inject the treatment fluid according to the second injection amount. The second injector is, thereby, controlled based on the pressure measurement and the trim calibration value, such that the trim calibration value allows for calibration of the second dosing module without influencing the control of the first dosing module.

II. Overview of Example Exhaust Aftertreatment Systems

Figure 2:
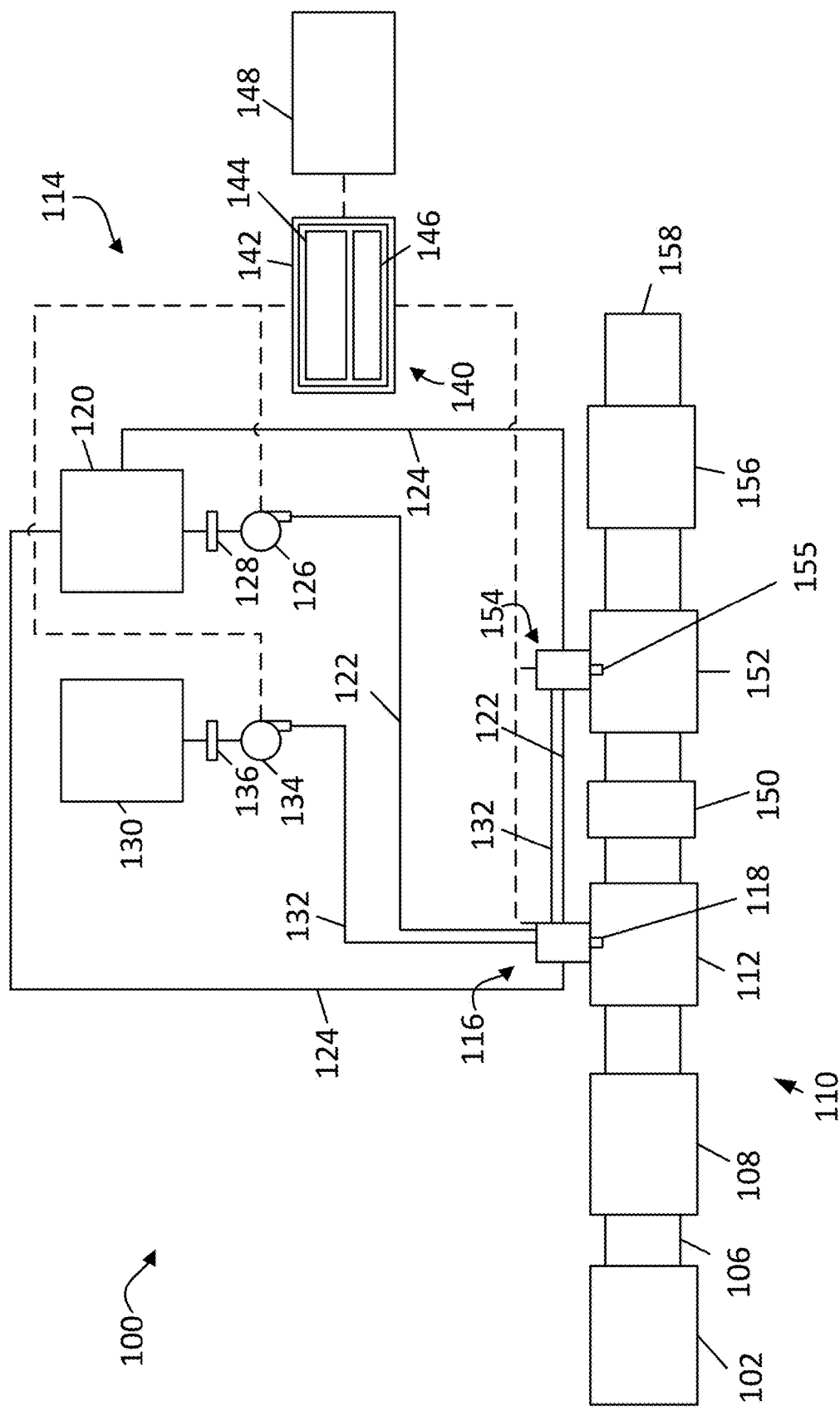
FIG. 2 is a block schematic diagram of another example exhaust aftertreatment system including the second dosing module and the controller.

FIGS. 1 and 2 depict an exhaust aftertreatment system 100 (e.g., treatment system, etc.) for treating exhaust produced by an internal combustion engine 102 (e.g., diesel internal combustion engine, gasoline internal combustion engine, hybrid internal combustion engine, propane internal combustion engine, dual-fuel internal combustion engine, etc.) according to various embodiments. The exhaust aftertreatment system 100 includes an exhaust conduit system 104. The exhaust conduit system 104 is configured to (e.g., structured to, able to, etc.) receive exhaust from the internal combustion engine 102 and provide the exhaust to ambient environment (e.g., atmosphere, etc.).

The exhaust conduit system 104 includes an upstream exhaust conduit 106 (e.g., line, pipe, etc.). The upstream exhaust conduit 106 is configured to receive exhaust from an upstream component (e.g., header, exhaust manifold, turbocharger, diesel oxidation catalyst, the internal combustion engine 102, etc.). In some embodiments, the upstream exhaust conduit 106 is coupled to (e.g., attached to, fixed to, welded to, fastened to, riveted to, etc.) the internal combustion engine 102. For example, the upstream exhaust conduit 106 may be coupled to an outlet of the internal combustion engine 102. In other embodiments, the upstream exhaust conduit 106 is integrally formed with the internal combustion engine 102. As utilized herein, two or more elements are "integrally formed" when the two or more elements are formed and joined together as part of a single manufacturing step to create a single-piece or unitary construction that cannot be disassembled without an at least partial destruction of the single-piece or unitary construction.

The exhaust aftertreatment system 100 may include a turbocharger 108 configured to receive exhaust from the internal combustion engine 102. While not shown, the turbocharger 108 may receive air and provide the air to the internal combustion engine 102. The turbocharger 108 utilizes energy from the exhaust produced by the internal combustion engine 102 to provide the air to the internal combustion engine 102. Specifically, the turbocharger 108 may pressurize the air provided to the internal combustion engine 102. In some embodiments, the turbocharger 108 includes a compressor wheel coupled to a turbine wheel via a connector shaft, where the exhaust produced by the internal combustion engine 102 spins the turbine wheel, which rotates the shaft and the compressor wheel to compress the air provided to the internal combustion engine 102. By compressing the air, the turbocharger 108 may enable the internal combustion engine 102 to operate with increased power and/or efficiency.

The exhaust conduit system 104 includes an exhaust conduit assembly 110. The exhaust conduit assembly 110 defines an exhaust flow path. In some embodiments, as shown in FIGS. 1 and 2, the exhaust conduit assembly 110 is coupled to the turbocharger 108. In some examples, the exhaust conduit assembly 110 may be fastened (e.g., using a band, using bolts, etc.), welded, riveted, or otherwise attached to the turbocharger 108. In other examples, the exhaust conduit assembly 110 is integrally formed with a housing of the turbocharger 108. In some embodiments, the exhaust conduit assembly 110 is disposed upstream of the turbocharger 108. For example, the exhaust conduit assembly 110 may provide the exhaust to the turbocharger 108. In some examples, the exhaust conduit assembly 110 may be disposed between the internal combustion engine 102 and the turbocharger 108. In some embodiments, the exhaust conduit assembly 110 is disposed downstream of the turbocharger 108. For example, the exhaust may be provided from the turbocharger 108 to the exhaust conduit assembly 110 and subsequently to other downstream components of the exhaust aftertreatment system 100. In other embodiments, the exhaust aftertreatment system 100 does not include the turbocharger 108 and the exhaust conduit assembly 110 is coupled to the upstream exhaust conduit 106.

The exhaust conduit system 104 further includes a first decomposition chamber 112 (e.g., decomposition reactor, decomposition chamber, reactor pipe, decomposition tube, reactor tube, an upstream decomposition chamber, etc.) configured to facilitate introduction of a treatment fluid (e.g., a reductant (e.g., diesel exhaust fluid (DEF), Adblue®, a urea-water solution (UWS), an aqueous urea solution (e.g., AUS32, etc.), etc.), a hydrocarbon fluid, etc.) into the exhaust. In some examples, where the treatment fluid is the reductant, the first decomposition chamber 112 is further configured to facilitate conversion of the reductant into ammonia. The first decomposition chamber 112 includes an inlet in fluid communication with an upstream component of the exhaust aftertreatment system 100 (e.g., the turbocharger 108, etc.) or the exhaust conduit system 104 (e.g., the upstream exhaust conduit 106, the exhaust conduit assembly 110, etc.), where the inlet of the first decomposition chamber 112 is configured to receive the exhaust containing $NO_x$ emissions. The first decomposition chamber 112 further includes an outlet configured to provide the exhaust, $NO_x$ emission, ammonia, and/or treatment fluid to a downstream component of the exhaust aftertreatment system 100 and/or the exhaust conduit system 104.

The exhaust aftertreatment system 100 further includes a treatment fluid delivery system 114. The treatment fluid delivery system 114 is configured to facilitate the introduction of a treatment fluid or a treatment fluid-air mixture into the exhaust. The treatment fluid delivery system 114 includes a first dosing module 116 (e.g., doser, dosing assembly, upstream dosing module, etc.). The first dosing module 116 facilitates passage of the treatment fluid into the first decomposition chamber 112. As is explained in more detail herein, the first dosing module 116 is configured to receive the treatment fluid and, in some embodiments, receive air, and provide the treatment fluid and/or treatment fluid-air mixture into the first decomposition chamber 112 to facilitate treatment of the exhaust. The exhaust aftertreatment system 100 may further include an insulator interposed between a portion of the first dosing module 116 and a portion of the first decomposition chamber 112 on which the first dosing module 116 is mounted. In some embodiments, the first dosing module 116 is coupled to the exhaust conduit assembly 110.

The first dosing module 116 includes a first injector 118 (e.g., insertion device, etc.) disposed at least partially within the first decomposition chamber 112. The first injector 118 is configured to dose (e.g., inject, insert, etc.) the treatment fluid or the treatment fluid-air mixture received by the first dosing module 116 into the exhaust within the first decomposition chamber 112.

The treatment fluid delivery system 114 further includes a treatment fluid source 120 (e.g., a treatment fluid tank, etc.) configured to provide and/or contain the treatment fluid. The treatment fluid delivery system 114 further includes a treatment fluid supply line 122 fluidly coupled to the treatment fluid source 120. The treatment fluid source 120 is configured to provide the treatment fluid to the first dosing module 116 via the treatment fluid supply line 122. The treatment fluid source 120 may include multiple treatment fluid sources 120 (e.g., multiple tanks connected in series or in parallel, etc.). In some examples, the treatment fluid source 120 may be a diesel exhaust fluid tank containing Adblue®.

The treatment fluid delivery system 114 further includes a treatment fluid return line 124 fluidly coupled to the first dosing module 116 and the treatment fluid source 120. The treatment fluid return line 124 is configured to return uninjected treatment fluid (e.g., treatment fluid not injected by the first dosing module 116 into the first decomposition chamber 112) from the first dosing module 116 to the treatment fluid source 120. In some embodiments, the treatment fluid delivery system 114 circulates the treatment fluid through treatment fluid supply (e.g., the treatment fluid source 120, etc.) and return lines (e.g., the treatment fluid supply line 122, the treatment fluid return line 124, etc.) to maintain the treatment fluid at a cold temperature and/or to prevent the treatment fluid from freezing.

The treatment fluid delivery system 114 further includes a treatment fluid pump 126 (e.g., treatment fluid supply unit, etc.) disposed downstream of the treatment fluid source 120. The treatment fluid pump 126 is configured to receive the treatment fluid from the treatment fluid source 120 and provide the treatment fluid to the first dosing module 116. The treatment fluid pump 126 is used to pressurize the treatment fluid from the treatment fluid source 120 for delivery to the first dosing module 116. The treatment fluid pump 126 may be pressure controlled. In some embodiments, the treatment fluid pump 126 is coupled to a chassis of a vehicle associated with the exhaust aftertreatment system 100.

The treatment fluid delivery system 114 may further include a treatment fluid filter 128 disposed upstream of the treatment fluid pump 126. The treatment fluid filter 128 is configured to receive the treatment fluid from the treatment fluid source 120 and provide the treatment fluid to the treatment fluid pump 126. The treatment fluid filter 128 filters the treatment fluid prior to the treatment fluid being provided to internal components of the treatment fluid pump 126. For example, the treatment fluid filter 128 may inhibit or prevent transmission of solids to the internal components of the treatment fluid pump 126, thereby prolonging desirable operation of the treatment fluid pump 126.

The treatment fluid delivery system 114 may include an air source 130 (e.g., an air intake, an air tank, etc.) configured to provide and/or contain the air. The treatment fluid delivery system 114 further includes an air supply line 132 fluidly coupled to the air source 130. The air source 130 is configured to provide the air to the first dosing module 116 via the air supply line 132. In some embodiments, the air source 130 includes multiple air sources 130 (e.g., multiple tanks connected in series or in parallel, etc.).

The treatment fluid delivery system 114 further includes an air pump 134 (e.g., an air supply unit, etc.) disposed downstream of the air source 130. The air pump 134 is configured to receive the air from the air source 130 and provide the air to the first dosing module 116. The air pump 134 is used to pressurize the air from the air source 130 for delivery to the first dosing module 116. The air pump 134 may be pressure controlled. In some embodiments, the air pump 134 is coupled to the chassis of the vehicle associated with the exhaust aftertreatment system 100.

The treatment fluid delivery system 114 may further include an air filter 136 disposed upstream of the air pump 134. The air filter 136 is configured to receive the air from the air source 130 and provide the air to the air pump 134. The air filter 136 filters the air prior to the air being provided to internal components of the air pump 134. For example, the air filter 136 may inhibit or prevent transmission of solids to the internal components of the air pump 134, thereby prolonging desirable operation of the air pump 134.

The first dosing module 116 may be further configured to mix the air and the treatment fluid into a treatment fluid-air mixture and to provide the treatment fluid-air mixture to the first injector 118 (e.g., for dosing into the exhaust within the first decomposition chamber 112, etc.). For example, the first injector 118 may be configured to dose the treatment fluid-air mixture into the exhaust within the first decomposition chamber 112.

In some embodiments, the exhaust aftertreatment system 100 further includes a coolant delivery system (e.g., engine coolant system, etc.) configured to facilitate cooling of components of the internal combustion engine 102 and/or the exhaust aftertreatment system 100 (e.g., the turbocharger 108, the treatment fluid delivery system 114, etc.).

The exhaust aftertreatment system 100 further includes a controller 140 (e.g., control circuit, driver, etc.) electrically coupled to components of the treatment fluid delivery system 114 (e.g., the first dosing module 116, the treatment fluid pump 126, the air pump 134, etc.). The controller 140 is configured to control the first dosing module 116 to dose the treatment fluid and/or the treatment fluid-air mixture into the first decomposition chamber 112. The controller 140 may also be configured to control the treatment fluid pump 126 and/or the air pump 134 to control the treatment fluid and/or the treatment fluid-air mixture that is dosed into the first decomposition chamber 112.

The controller 140 includes a processing circuit 142. The processing circuit 142 includes a processor 144. The processor 144 may include a microprocessor, an application-specific integrated circuit (ASIC), a field-programmable gate array (FPGA), etc., or combinations thereof. The processing circuit 142 further includes a memory 146. The memory 146 may include, but is not limited to, electronic, optical, magnetic, or any other storage or transmission device capable of providing a processor, ASIC, FPGA, etc. with program instructions. The memory 146 may include a memory chip, Electrically Erasable Programmable Read-Only Memory (EEPROM), Erasable Programmable Read Only Memory (EPROM), flash memory, or any other suitable memory from which the controller 140 can read instructions. The instructions may include code from any suitable programming language. The memory 146 may include various modules that include instructions which are configured to be implemented by the processor 144.

In various embodiments, the controller 140 is configured to communicate with a central controller 148 (e.g., an engine control unit (ECU), an engine control module (ECM), etc.) of an internal combustion engine 102 including the exhaust aftertreatment system 100. In some embodiments, the central controller 148 and the controller 140 are integrated into a single controller.

The central controller 148 may be communicable with a display device (e.g., a screen, a monitor, a touch screen, a heads-up display (HUD), an indicator light, etc.). The display device may be configured to change state in response to receiving information from the central controller 148. For example, the display device may be configured to change between a static state and an alarm state based on a communication from the central controller 148. By changing state, the display device may provide an indication to a user of a status of the treatment fluid delivery system 114.

The exhaust aftertreatment system 100 may further include a particulate filter 150 (e.g., a diesel particulate filter (DPF)) disposed downstream of the first decomposition chamber 112 and configured to receive the exhaust from the first decomposition chamber 112. The particulate filter 150 is configured to remove particulate matter, such as soot, from the exhaust flowing in the exhaust conduit system 104. The particulate filter 150 includes an inlet, where the exhaust is received, and an outlet, where the exhaust exits after having particulate matter at least partially filtered from the exhaust and/or converting the particulate matter into carbon dioxide. In some embodiments, the particulate filter 150 is omitted from the exhaust aftertreatment system 100. In some embodiments, the particulate filter 150 is coupled to the exhaust conduit assembly 110. For example, the particulate filter 150 may be fastened (e.g., using a band, using bolts, etc.), welded, riveted, or otherwise attached to the exhaust conduit assembly 110. In other embodiments, the particulate filter 150 is integrally formed with (e.g., unitarily formed with, formed as a one-piece construction with, inseparable from, etc.) the exhaust conduit assembly 110.

The exhaust conduit system 104 may further include a second decomposition chamber 152 (e.g., downstream decomposition chamber, etc.) disposed downstream of the first decomposition chamber 112. The second decomposition chamber 152 is configured to facilitate introduction of treatment fluid into the exhaust. In some examples, where the treatment fluid is the reductant, the second decomposition chamber 152 is further configured to facilitate conversion of the reductant into ammonia. The second decomposition chamber 152 includes an inlet in fluid communication with an upstream component of the exhaust aftertreatment system 100 (e.g., the turbocharger 108, the particulate filter 150 etc.) or the exhaust conduit system 104 (e.g., the first decomposition chamber 112, etc.), where the inlet of the second decomposition chamber 152 is configured to receive the exhaust and/or the treatment fluid. The second decomposition chamber 152 further includes an outlet configured to provide the exhaust, $NO_x$ emission, ammonia, and/or treatment fluid to a downstream component of the exhaust aftertreatment system 100 and/or the exhaust conduit system 104.

The treatment fluid delivery system 114 may include a second dosing module 154 (e.g., downstream dosing module, etc.). The second dosing module 154 is configured to facilitate passage of the treatment fluid or the treatment fluid-air mixture into the second decomposition chamber 152. The second dosing module 154 is configured to receive the treatment fluid and, in some embodiments, receive air, and provide the treatment fluid and/or treatment fluid-air mixture into the second decomposition chamber 152 to facilitate treatment of the exhaust. The exhaust aftertreatment system 100 may further includes an insulator interposed between a portion of the second dosing module 154 and a portion of the second decomposition chamber 152 on which the second dosing module 154 is mounted. In some embodiments, the second dosing module 154 is coupled to the second decomposition chamber 152.

The second dosing module 154 includes a second injector 155 (e.g., insertion device, etc.) disposed at least partially within the second decomposition chamber 152. The second injector 155 is configured to dose the treatment fluid received by the second dosing module 154 into the exhaust within the second decomposition chamber 152.

In some embodiments, the second dosing module 154 receives the treatment fluid from the treatment fluid source 120 (or a different treatment fluid source), via the treatment fluid supply line 122, and provides the treatment fluid, via the second injector 155, to the exhaust. In other embodiments, the second dosing module 154 receives the treatment fluid from the treatment fluid source 120 (or a different treatment fluid source), via the treatment fluid supply line 122, receives the air from the air source 130 (or a different air source), via the air supply line 132, and provides the treatment fluid-air mixture, via the second injector 155, to the exhaust.

In some embodiments, as shown in FIG. 1, both the second dosing module 154 and the first dosing module 116 have separate treatment fluid supply lines 122 extending from the treatment fluid source 120 (or after the treatment fluid pump 126) and separate air supply lines 132 extending from the air source 130 (or after the air pump 134).

The second dosing module 154 is electrically coupled to the controller 140. The controller 140 is configured to control the second dosing module 154 to dose the treatment fluid and/or the treatment fluid-air mixture into the second decomposition chamber 152. The controller 140 may also be configured to operate the treatment fluid pump 126 and/or the air pump 134 to control the treatment fluid and/or the treatment fluid-air mixture that is dosed into the second decomposition chamber 152.

The exhaust conduit system 104 may include a catalyst member 156 (e.g., a Selective Catalytic Reduction (SCR) member, etc.) disposed downstream of the second decomposition chamber 152. The catalyst member 156 is configured to receive a mixture of the treatment fluid and the exhaust from the second decomposition chamber 152. The treatment fluid droplets undergo the processes of evaporation, thermolysis, and hydrolysis to form non-$NO_x$ emissions (e.g., gaseous ammonia, etc.) within the exhaust conduit system 104.

The catalyst member 156 includes an inlet in fluid communication with the second decomposition chamber 152 and configured to receive the exhaust and the treatment fluid from the second decomposition chamber 152. The catalyst member 156 further includes an outlet in fluid communication with a downstream component or an end of the exhaust conduit system 104 and configured to provide the exhaust.

In some embodiments, the catalyst member 156 is coupled to the second decomposition chamber 152. For example, the catalyst member 156 may be fastened, welded, riveted, or otherwise attached to the second decomposition chamber 152. In other embodiments, the catalyst member 156 is integrally formed with the second decomposition chamber 152.

The catalyst member 156 is configured to receive, treat, and output the exhaust. For example, the catalyst member 156 is configured to cause decomposition of components of the exhaust using the treatment fluid (e.g., via catalytic reactions, etc.). Specifically, the treatment fluid provided into the exhaust in the first decomposition chamber 112 and the second decomposition chamber 152 undergoes the processes of evaporation, thermolysis, and hydrolysis to form non-$NO_x$ emissions within the first decomposition chamber 112, the second decomposition chamber 152, and/or the catalyst member 156. The catalyst member 156 is configured to assist in reduction of $NO_x$ emissions by accelerating a $NO_x$ reduction process between the treatment fluid and the $NO_x$ of the exhaust to form diatomic nitrogen, water, and/or carbon dioxide.

The exhaust aftertreatment system 100 also includes a downstream exhaust conduit 158 (e.g., line, pipe, etc.) disposed downstream of the catalyst member 156. The downstream exhaust conduit 158 is configured to receive the exhaust from the catalyst member 156 and provide the exhaust to an ambient environment (e.g., atmosphere, etc.). In some embodiments, the downstream exhaust conduit 158 is coupled to the catalyst member 156. In other embodiments, the downstream exhaust conduit 158 is integrally formed with the catalyst member 156.

The exhaust aftertreatment system 100 may further includes an oxidation catalyst (e.g., a diesel oxidation catalyst (DOC), etc.) in fluid communication with the exhaust conduit system 104. For example, the oxidation catalyst may be disposed upstream of the particulate filter 150, downstream of the catalyst member 156, or the like. The oxidation catalyst is configured to oxidize hydrocarbons and carbon monoxide in the exhaust.

FIG. 2 illustrates another embodiment of the exhaust aftertreatment system 100. In such embodiment, both the first dosing module 116 and the second dosing module 154 receive the treatment fluid from the treatment fluid source 120. The treatment fluid pump 126 initially provides the treatment fluid to the first dosing module 116 via the treatment fluid supply line 122. The treatment fluid supply line 122 extends from the first dosing module 116 to the second dosing module 154, such that the treatment fluid travels from the first dosing module 116 to the second dosing module 154. The treatment fluid return line 124 receives the uninjected treatment fluid from the second dosing module 154 and returns the treatment fluid to the treatment fluid source 120.

In these embodiments, the first dosing module 116 and the second dosing module 154 receive the air from the air source 130. The air pump 134 initially provides the air to the first dosing module 116 via the air supply line 132. The air supply line 132 extends from the first dosing module 116 to the second dosing module 154, such that the air travels from the first dosing module 116 to the second dosing module 154. The air may be released from the second dosing module 154 or the treatment fluid delivery system 114 may include an air return line to return the air to the air source 130.

While the exhaust aftertreatment system 100 has been shown and described in the context of use with a diesel internal combustion engine, it is to be appreciated that the exhaust aftertreatment system 100 may be used with other internal combustion engines, such as gasoline internal combustion engines, hybrid internal combustion engines, propane internal combustion engines, dual-fuel internal combustion engines, and other similar internal combustion engines.

It is to be appreciated that the treatment fluid delivery system 114 may be used with a hydrocarbon fluid (e.g., fuel, lubricant, oil, etc.). In these embodiments, an igniter (e.g., spark plug, etc.) may be positioned downstream of the first dosing module 116 and/or the second dosing module 154 and utilized to ignite the hydrocarbon fluid. This ignition causes an increase in temperature of the exhaust downstream of the first dosing module 116 and/or the second dosing module 154, which may be utilized to regenerate the catalyst member 156.

III. Overview of Controller and Dosing Module

Figure 3:
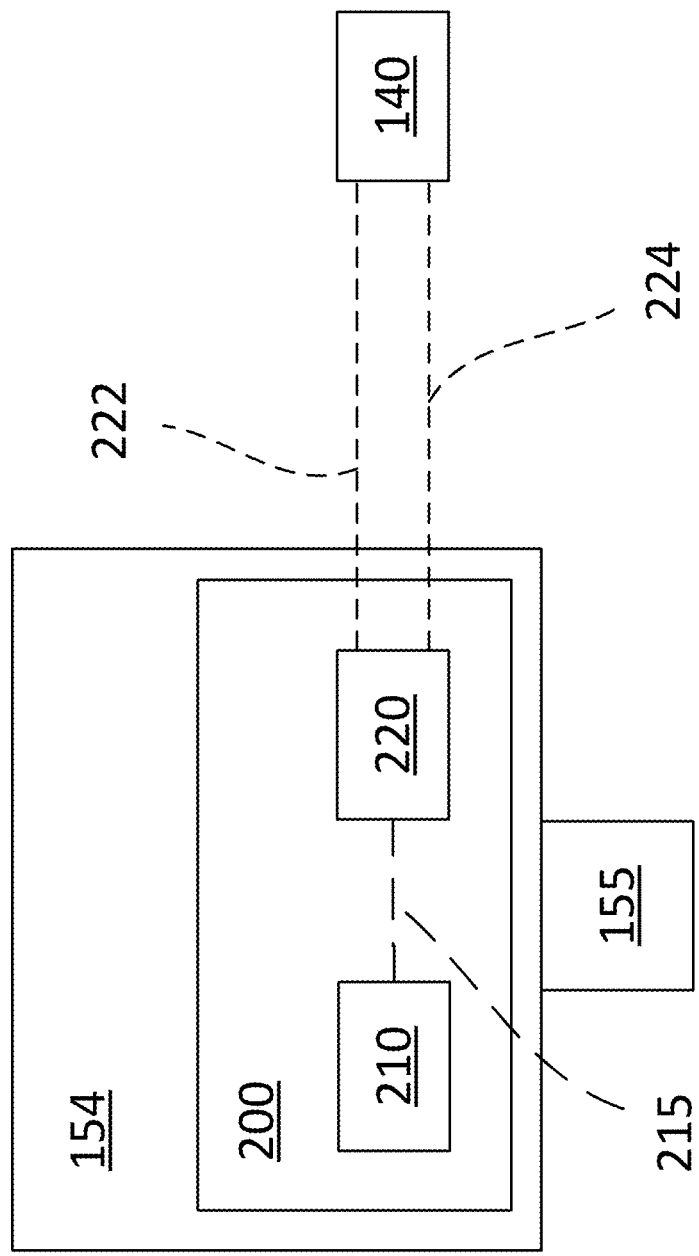
FIG. 3 illustrates an example block schematic diagram of the second dosing module and the controller.

FIG. 3 illustrates an example block schematic diagram of the second dosing module 154 and the controller 140, according to an embodiment. The second dosing module 154 may include a pressure sensor 200 configured to generate a pressure signal based on a pressure of the treatment fluid in the second dosing module 154 (e.g., a housing of the second dosing module 154, etc.). The pressure sensor 200 includes a sensing element 210 configured to provide a pressure voltage 215 based on the pressure of the treatment fluid in the second dosing module 154. The pressure sensor 200 further includes a first signal conditioner 220 electrically coupled to the sensing element 210. The pressure sensor 200 is configured to receive the pressure voltage 215 from the sensing element 210 and output a pressure signal 222. In some embodiments, the first signal conditioner 220 is directly electrically coupled to the controller 140. In other embodiments, the first signal conditioner 220 is electrically coupled to the controller 140 via electrical coupling between the second dosing module 154 and the controller 140.

The controller 140 may be configured to receive the pressure signal 222 from the pressure sensor 200 (or the first signal conditioner 220), determine a pressure measurement based on the pressure signal 222, determine an injection amount based on the pressure measurement, and cause the second injector 155 of the second dosing module 154 to inject the treatment fluid according to the injection amount. The injection amount determined by the controller 140 may be in units of fluid volume (e.g., milliliters (ml), fluid ounces (fl. oz), etc.), mass (e.g., grams (g), etc.), volumetric flow rate (e.g., ml per second(s), etc.), mass flow rate (e.g., g/s, etc.), length of time at which an injector (e.g., the first injector 118, the second injector 155, etc.) remains open (e.g., milliseconds (ms), microseconds (μs), etc.), or the like.

In some embodiments, the injection amount determined by the controller 140 is lower than or higher than a desired injection amount (e.g., ideal injection amount, required injection amount, etc.). The desired injection amount may be associated with an amount of treatment fluid and/or treatment fluid-air mixture corresponding to a maximum $NO_x$ conversion efficiency. In some embodiments, the maximum $NO_x$ conversion efficiency is based on characteristics of the exhaust (e.g., contamination level, emission levels, etc.), specifications of dosing modules (e.g., the first dosing module 116, the second dosing module 154, etc.), such as maximum injection flow rate, specifications of decomposition chambers (e.g., the first decomposition chamber 112, the second decomposition chamber 152, etc.), such as dimensions, and/or the like.

The first signal conditioner 220 may be further configured to receive the pressure voltage 215 from the sensing element 210, determine a trim calibration value based on a trim calibration function and the pressure voltage 215, and output a trimmed pressure signal 224. The first signal conditioner 220 may determine the trimmed pressure signal 224 based on the pressure voltage 215 and the trim calibration value. The controller 140 is configured to receive the trimmed pressure signal 224 from the pressure sensor 200 (or the first signal conditioner 220), determine a trimmed pressure measurement based on the trimmed pressure signal 224, determine a trimmed injection amount based on the trimmed pressure measurement, and cause the second injector 155 of the second dosing module 154 to inject the treatment fluid according to the trimmed injection amount. In some embodiments, the trimmed injection amount determined by the controller 140 is equal to, or approximately equal to, the desired injection amount.

Figure 4:
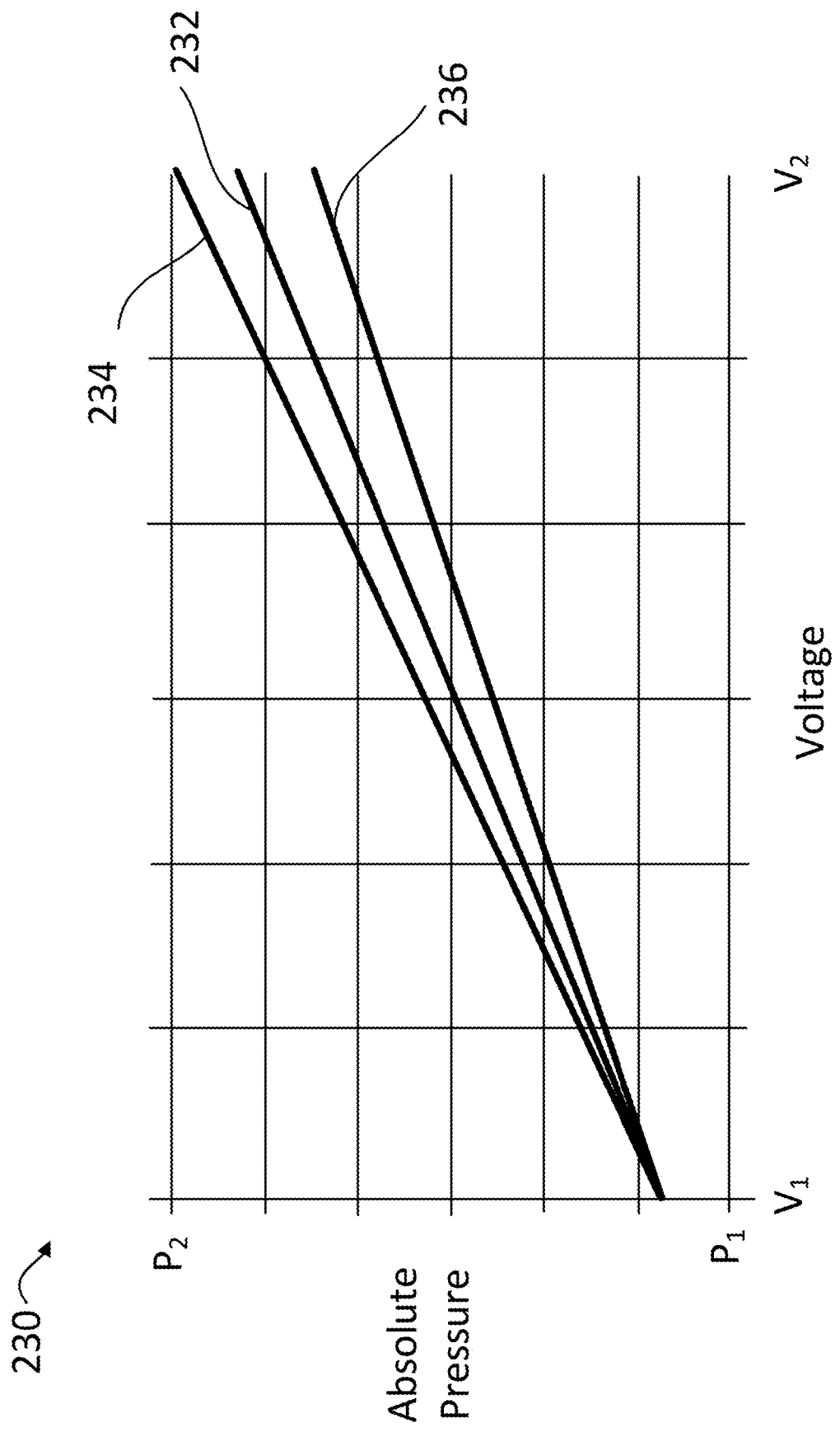
FIG. 4 illustrates a graph of a trim calibration function defining a relationship between a voltage reading from a pressure sensor and a determined pressure variance.

FIG. 4 illustrates a graph of a trim calibration function 230 defining a relationship to adjust voltage reading from a pressure sensor (e.g., the pressure sensor 200) to provide a pressure offset based on absolute pressure that can be used to compensate for flow variance in a dosing module (e.g., the first dosing module 116, the second dosing module 154, etc.), according to an embodiment. The voltage reading of the trim calibration function 230 may include a range of a first voltage reading ($V_1$) to a second voltage reading ($V_2$). The absolute pressure of the trim calibration function 230 may include a range of a first absolute pressure ($P_1$) to a second absolute pressure ($P_2$). A target trim calibration function 232 of the trim calibration function 230 defines a relationship between a voltage reading from the pressure sensor 200 and a determined absolute pressure associated with the second dosing module 154. The second dosing module 154 may have a part to part flow variation between a lower limit and a higher limit. Depending on this part to part flow variation, the target trim calibration function 232 may be adjusted to a curve at or in-between an upper trim tolerance calibration function 234 or a lower trim tolerance calibration function 236 of the trim calibration function 230. As a result, the flow in the second dosing module 154 will be associated with the target trim calibration function 232.

The trim calibration function 230 (e.g., the target trim calibration function 232) may be generated at an End of Line (EOL) test, where the target dosing module and/or the target injector is tested at a predetermined pressure value to measure an output injection amount. In some examples, the output injection amount at the predetermined pressure value is unequal to (e.g., higher than or lower than) the desired injection amount. Based on a difference between the output injection amount and the desired injection amount, a pressure variance value may be recorded. The pressure variance value corresponds to a difference between an output pressure value associated with the output injection amount and a desired pressure value associated with the desired injection amount. The pressure variance value may be associated with an output voltage value (e.g., the pressure voltage 215, etc.) corresponding to the output pressure value associated with the output injection amount.

For example, the output voltage value may be 3 volts (V), corresponding to the output pressure value of 900 kilopascals (kPa), and the desired pressure value may be 950 kPa, resulting in the pressure variance value of +50 kPa, such that the pressure variance value of +50 kPa is associated with the output voltage value of 3V. In some examples, the first signal conditioner 220 receives the pressure voltage 215 equal to the output voltage value of 3V, determines a trim calibration value equal to the pressure variance value of +50 kPa based on the pressure voltage 215 (e.g., 3V) using the trim calibration function 230, and outputs the trimmed pressure signal 224 determined based on the pressure voltage 215 (e.g., 3V) and the trim calibration value (e.g., +50 kPa). In some examples, a trimmed pressure measurement determined by the controller 140 based on the trimmed pressure signal 224 is equal to a sum of (i) the pressure measurement (e.g., 900 kPa) determined based on the pressure signal 222 and (ii) the trim calibration value (e.g., +50 kPa), such that the trimmed pressure measurement (e.g., 950 kPa) is equal to the desired pressure value (e.g., 950 kPa).

In some embodiments, the target dosing module and/or the target injector is tested at a plurality of predetermined pressure values to measure a plurality of output injection amounts, such that a plurality of pressure variance values is recorded based on differences between the plurality of output injection amounts and a plurality of desired injection amounts. In some embodiments, the target trim calibration function 232 is generated based on the plurality of pressure variance values and a plurality of output voltage values corresponding to the plurality of predetermined pressure values.

In some embodiments, the upper trim tolerance calibration function 234 is based on the target trim calibration function 232 with an increase in slope equal to a predetermined slope variance. The lower trim tolerance calibration function 236 may be based on the target trim calibration function 232 with a decrease in slope equal to the predetermined slope variance. In some examples, the predetermined slope variance is a percentage of a slope of the target trim calibration function 232 (e.g., 3% of the slope of the target trim calibration function 232, 7% of the slope of the target trim calibration function 232, etc.). The predetermined slope variance for the upper trim tolerance calibration function 234 may be different from or equal to the predetermined slope variance for the lower trim tolerance calibration function 236. In some embodiments, the upper trim tolerance calibration function 234 and/or the lower trim tolerance calibration function 236 are stored in the controller 140 (e.g., via the memory 146). In other embodiments, the upper trim tolerance calibration function 234 and/or the lower trim tolerance calibration function 236 are determined by the controller 140.

The controller 140 may utilize the trim calibration function 230 for operating the first injector 118 and/or the second injector 155. The controller 140 may be defaulted to utilizing the target trim calibration function 232, such that the controller 140 may be reconfigured to utilize the upper trim tolerance calibration function 234 or the lower trim tolerance calibration function 236.

In some embodiments, the controller 140 is reconfigured to utilize the upper trim tolerance calibration function 234 instead of the target trim calibration function 232 based on the first injector 118 and/or the second injector 155 underdosing (e.g., the output injection amount being less than the desired injection amount), thereby eliminating or reducing the underdosing of the first injector 118 and/or the second injector 155. In some examples, the first injector 118 and/or the second injector 155 may be underdosing due to a component of the first injector 118 and/or the second injector 155, or the first dosing module 116 and/or the second dosing module 154, having different components than the target injector and/or the target dosing module used for generating the target trim calibration function 232. For example, the first injector 118 and/or the second injector 155 may include a nozzle different from the nozzle of the target injector. In some examples, the first injector 118 and/or the second injector 155 may be underdosing due to a component of the first injector 118 and/or the second injector 155, or the first dosing module 116 and/or the second dosing module 154, reaching an end of its life span.

In some embodiments, the controller 140 is reconfigured to utilize the lower trim tolerance calibration function 236 instead of the target trim calibration function 232 based on the first injector 118 and/or the second injector 155 overdosing (e.g., the output injection amount being more than the desired injection amount), thereby eliminating or reducing overdosing of the first injector 118 and/or the second injector 155. In some examples, the first injector 118 and/or the second injector 155 may be overdosing due to a component of the first injector 118 and/or the second injector 155, or the first dosing module 116 and/or the second dosing module 154, having different components than the target injector and/or the target dosing module used for generating the target trim calibration function 232. For example, the first injector 118 and/or the second injector 155 may include a nozzle different from the nozzle of the target injector.

Figure 5:
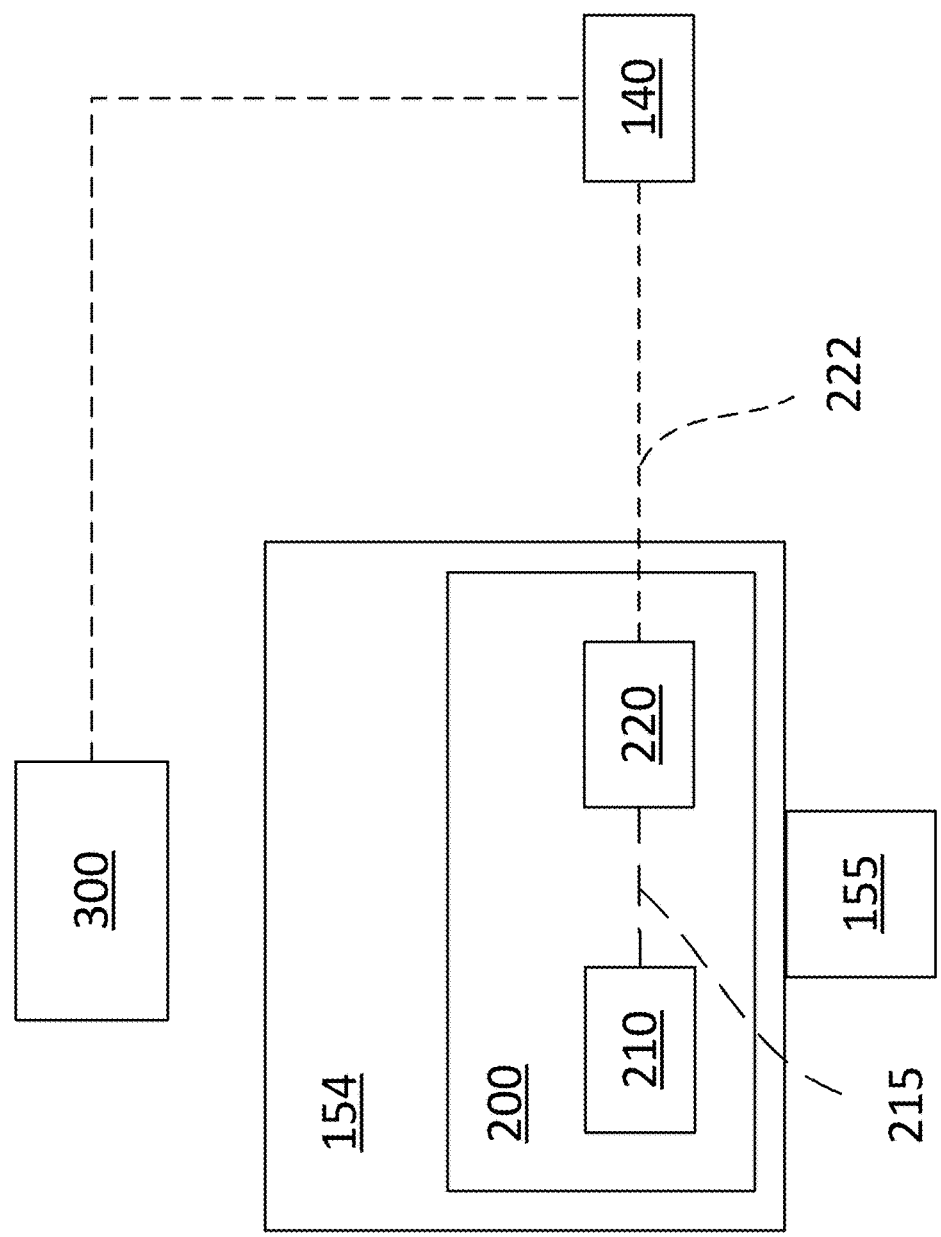
FIG. 5 illustrates another example block schematic diagram of the second dosing module and the controller.

FIG. 5 illustrates another example block schematic diagram of the second dosing module 154 and the controller 140, according to an embodiment. The exhaust aftertreatment system 100 may include a first variable resistor 300 electrically coupled to the controller 140. The first variable resistor 300 is selectively switchable between multiple resistances. In some examples, the first variable resistor 300 may be selectively switchable between a first state and a second state and configured to provide a first resistance in the first state and a second resistance in the second state. In some embodiments, the first resistance is higher than the second resistance. In other embodiments, the first resistance is less than the second resistance. In other examples, the first variable resistor 300 is selectively switchable between more than two states (e.g., the first state, the second state, etc.) and is configured to provide more than two resistances (e.g., the first resistance, the second resistance, etc.). For example, the first variable resistor 300 may be selectively switchable between the first state, the second state, and an additional state and configured to provide the first resistance in the first state, the second resistance in the second state, and an additional resistance in the additional state.

The controller 140 is electrically coupled to the first variable resistor 300, such that the controller 140 can determine the resistance of the first variable resistor 300. In some examples, the controller 140 can determine a first resistance state (e.g., the first state, the second state, the additional state, etc.) and/or a first resistance value (e.g., the first resistance, the second resistance, the additional resistance, etc.) of the first variable resistor 300.

For example, the controller 140 may be configured to receive a first electrical charge from the first variable resistor 300 and determine the first resistance state and/or the first resistance value based on the first electrical charge. In some embodiments, the controller 140 receives or retrieves a first fixed voltage value, receives the first electrical charge from the first variable resistor 300, determines a first electrical current of the first electrical charge, and determines the first resistance state and/or the first resistance value of the first variable resistor 300 based on the first fixed voltage value and the first electrical current. For example, the controller 140 may acts as, or includes, an ammeter that determines the first electrical current of the first electrical charge by measuring the first electrical current of the first electrical charge. In some embodiments, the first fixed voltage value is a voltage amount used by the first variable resistor 300.

In some embodiments, the controller 140 is configured to receive the pressure signal 222 (e.g., untrimmed pressure signal) from the pressure sensor, determine a pressure measurement (e.g., untrimmed pressure measurement) based on the pressure signal 222, determine a first injection amount based on at least the pressure measurement, and cause the first injector 118 to inject the treatment fluid according to the first injection amount. The controller 140 may be further configured to determine a second injection amount based on the pressure measurement and at least one of the first resistance or the second resistance of the first variable resistor 300 and cause the second injector 155 to inject the treatment fluid according to the second injection amount.

Figure 6:
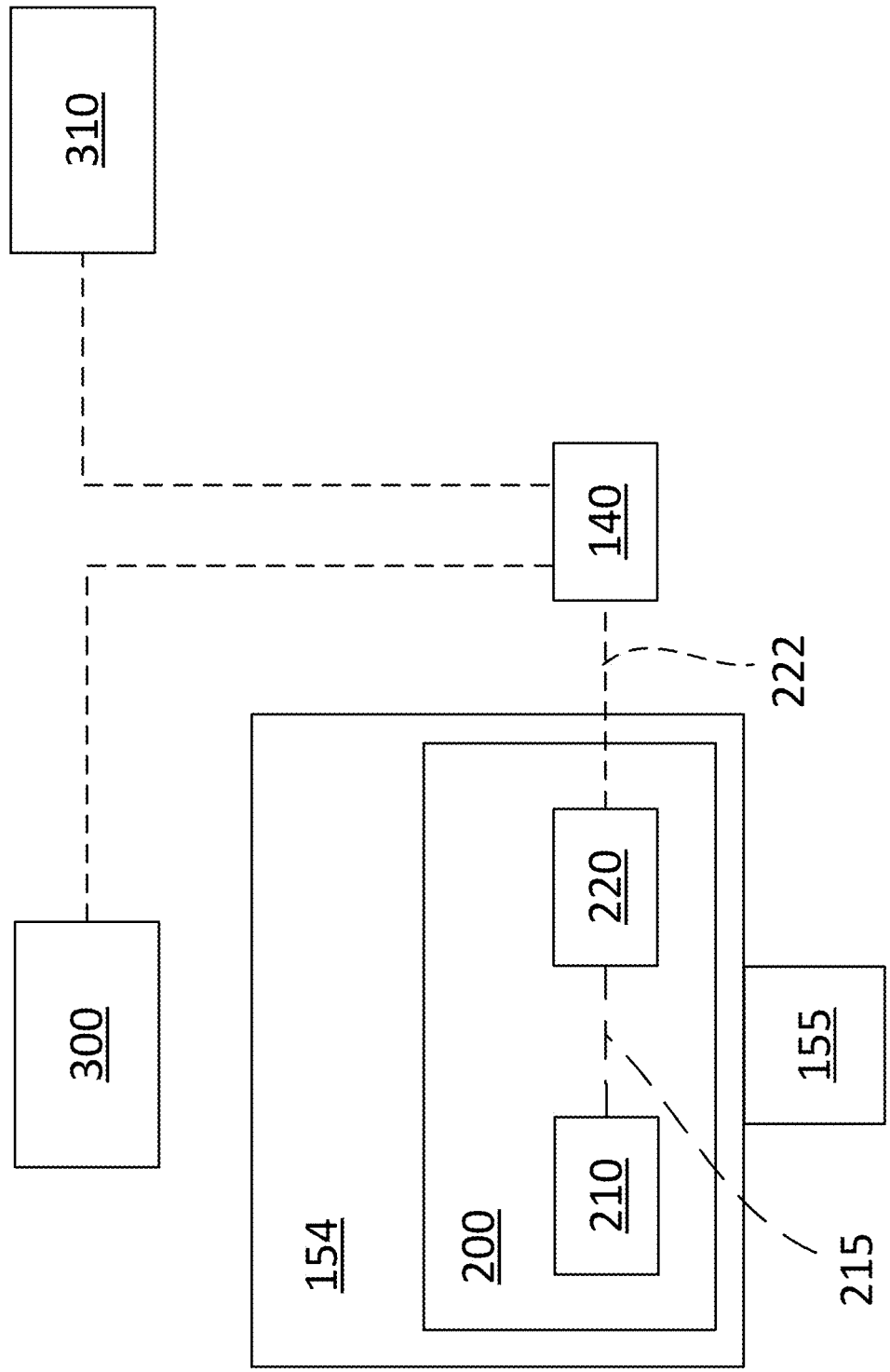
FIG. 6 illustrates yet another example block schematic diagram of the second dosing module and the controller, according to an embodiment.

FIG. 6 illustrates yet another example block schematic diagram of the second dosing module 154 and the controller 140, according to an embodiment. The exhaust aftertreatment system 100 may further include a second variable resistor 310 electrically coupled to the controller 140. The second variable resistor 310 is selectively switchable between multiple resistances. In some examples, the second variable resistor 310 is selectively switchable between a third state and a fourth state and configured to provide a third resistance in the third state and a fourth resistance in the fourth state. In some embodiments, the third resistance is higher than the fourth resistance. In other embodiments, the third resistance is less than the fourth resistance. In other examples, the second variable resistor 310 is selectively switchable between more than two states (e.g., the third state, the fourth state, etc.) and is configured to provide more than two resistances (e.g., the third resistance, the fourth resistance, etc.). For example, the second variable resistor 310 may be selectively switchable between the third state, the fourth state, and a fifth state and configured to provide the third resistance in the third state, the fourth resistance in the fourth state, and a fifth resistance in the fifth state.

The controller 140 is electrically coupled to the second variable resistor 310, such that the controller 140 can determine the resistance of the second variable resistor 310. In some examples, the controller 140 can determine a second resistance state (e.g., the third state, the fourth state, the fifth state, etc.) and/or a second resistance value (e.g., the third resistance, the fourth resistance, the fifth resistance, etc.) of the second variable resistor 310.

For example, the controller 140 may be configured to receive a second electrical charge from the second variable resistor 310 and determine the second resistance state and/or the second resistance value based on the second electrical charge. In some embodiments, the controller 140 receives or retrieves a second fixed voltage value, receives the second electrical charge from the second variable resistor 310, determines a second electrical current of the second electrical charge, and determines the second resistance state and/or the second resistance value of the second variable resistor 310 based on the second fixed voltage value and the second electrical current. For example, the controller 140 may acts as, or includes, the ammeter that determines the second electrical current of the second electrical charge by measuring the second electrical current of the second electrical charge. In some embodiments, the second fixed voltage value is a voltage amount used by the second variable resistor 310.

In some embodiments, the controller 140 is configured to receive the pressure signal 222 from the pressure sensor, determine a pressure measurement based on the pressure signal 222, determine a first injection amount based on at least the pressure measurement and at least one of the third resistance or the fourth resistance of the second variable resistor 310, and cause the first injector 118 to inject the treatment fluid according to the first injection amount. The controller 140 may be further configured to determine a second injection amount based on the pressure measurement and at least one of the first resistance or the second resistance of the first variable resistor 300 and cause the second injector 155 to inject the treatment fluid according to the second injection amount.

Figure 7:
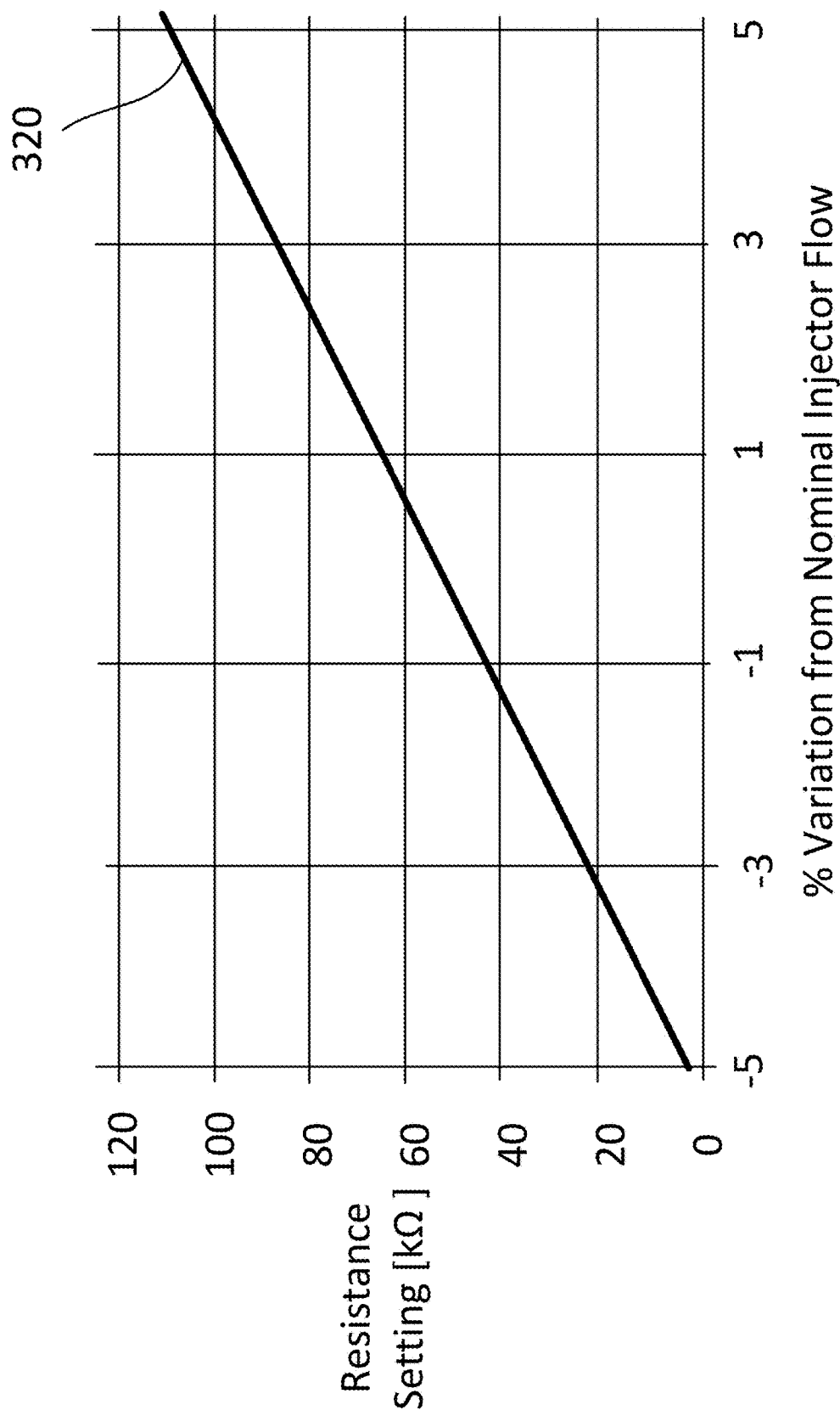
FIG. 7 illustrates a graph of a resistance calibration function defining a relationship between a percent variation from nominal injector flow of an injector of at least one of the first dosing module or the second dosing module and a resistance setting for a variable resistor associated with the at least one of the first dosing module or the second dosing module.

FIG. 7 illustrates a graph of a resistance calibration function 320 defining a relationship between a percent variation from nominal injector flow and a resistance setting for a variable resistor (e.g., the first variable resistor 300, the second variable resistor 310, etc.), according to an embodiment. The nominal injector flow may be associated with the injection amounts described herein. For example, the percent variation from the nominal injector flow may include, or be replaced by, a percent variation from the injection amount, a volume variation from the injection amount, a mass variation from the injection amount, or the like.

In some embodiments, the controller 140 is configured to adjust a resistance value (e.g., the first resistance, the second resistance, the third resistance, the fourth resistance, etc.) of the variable resistor, by changing a resistance state (e.g., the first state, the second state, the third state, the fourth state, etc.) of the variable resistor, using the resistance calibration function 320. For example, the controller 140 may be configured to retrieve or receive the resistance calibration function 320, receive a determined percent variation from the nominal injector flow (or a determined percent variation from the injection amount, a determined volume variation from the injection amount, etc.), determine a resistance setting corresponding to the determined percent variation from the nominal injector flow based on the resistance calibration function 320, and adjust the resistance state of the variable resistor such that the resistance value of the variable resistor is equal to, or approximately equal to, the determined resistance setting. In other embodiments, a user adjusts the resistance value of the variable resistor, by changing the resistance state of the variable resistor, using the resistance calibration function 320 and the determined percent variation from the nominal injector flow. In some embodiments, the determined percent variation from the nominal injector flow is determined at the EOL test.

Figure 8:
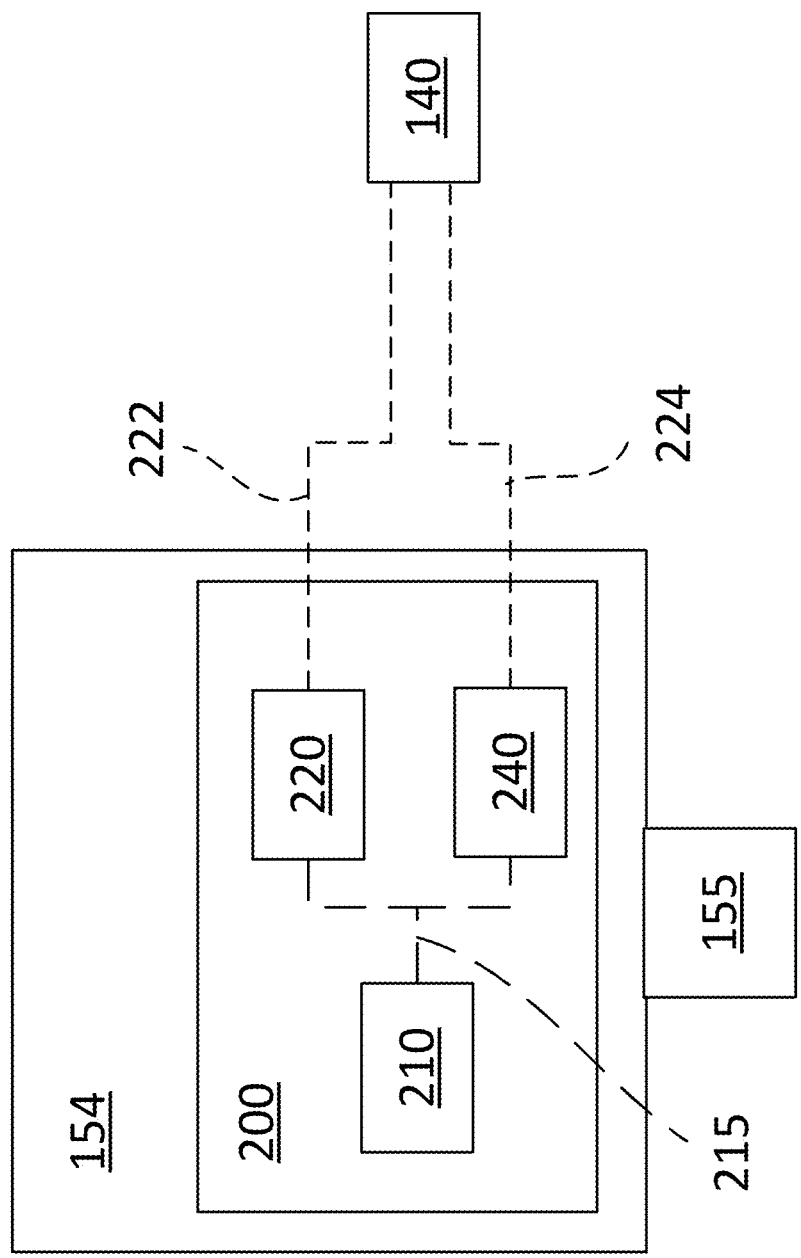
FIG. 8 illustrates yet another example block schematic diagram of the second dosing module and the controller.

FIG. 8 illustrates yet another example block schematic diagram of the second dosing module 154 and the controller 140, according to an embodiment. The pressure sensor 200 may further include a second signal conditioner 240 electrically coupled to the sensing element 210. The second signal conditioner 240 is configured to receive the pressure voltage 215 from the sensing element 210, determine a trim calibration value based on the trim calibration function 230 and the pressure voltage 215, and output the trimmed pressure signal 224, where the trimmed pressure signal 224 is determined based on the pressure voltage 215 and the trim calibration value. In some embodiments, the second signal conditioner 240 is directly electrically coupled to the controller 140. In other embodiments, the second signal conditioner 240 is electrically coupled to the controller 140 via the electrical coupling between the second dosing module 154 and the controller 140.

In some embodiments, the controller 140 is configured to receive the pressure signal 222 (e.g., the untrimmed pressure signal) from the first signal conditioner 220 (or the pressure sensor 200) and the trimmed pressure signal 224 from the second signal conditioner 240 (or the pressure sensor 200), determine a pressure measurement (e.g., the untrimmed pressure measurement) based on the pressure signal 222, determine a first injection amount based on at least the pressure measurement, and cause the first injector 118 to inject the treatment fluid according to the first injection amount. The controller 140 may be further configured to determine a trimmed pressure measurement based on the trimmed pressure signal 224, determine a second injection amount based on the trimmed pressure measurement, and cause the second injector 155 to inject the treatment fluid according to the second injection amount.

Figure 9:
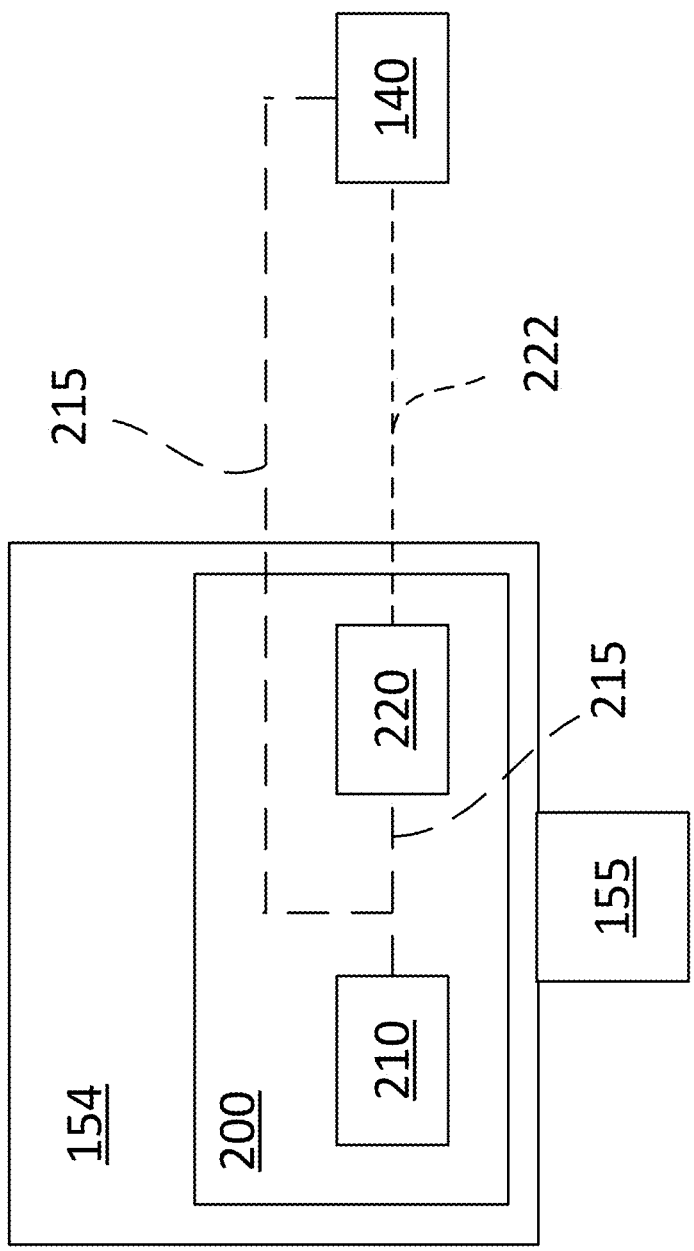
FIG. 9 illustrates yet another example block schematic diagram of the second dosing module and the controller.

FIG. 9 illustrates yet another example block schematic diagram of the second dosing module 154 and the controller 140, according to an embodiment. In some embodiments, the controller 140 is configured to receive the pressure signal 222 (e.g., the untrimmed pressure signal) from the pressure sensor 200, determine the pressure measurement (e.g., the untrimmed pressure measurement) based on the pressure signal 222, determine the first injection amount based on at least the pressure measurement, and cause the first injector 118 to inject the treatment fluid according to the first injection amount. The controller 140 may be further configured to receive the pressure voltage 215 from the pressure sensor 200 (or the sensing element 210), determine a trim calibration value based on the trim calibration function 230 and the pressure voltage 215, determine the second injection amount based on the pressure measurement and the trim calibration value, and cause the second injector 155 to inject the treatment fluid according to the second injection amount.

In some embodiments, the trim calibration function 230 is stored in the memory 146 of the controller 140. In some embodiments, the controller 140 is configured to receive at least one of the pressure voltage 215 from the sensing element 210 (or the pressure sensor 200) or the pressure signal 222 from the first signal conditioner 220 (or the pressure sensor 200) after the trim calibration function 230 is stored in the memory 146. In further embodiments, the controller 140 is further configured to receive the trim calibration function 230 from the pressure sensor 200 (or the first signal conditioner 220). In yet further embodiments, the controller 140 is further configured to receive the trim calibration function 230 from the pressure sensor 200 (or the first signal conditioner 220) after the pressure sensor 200 (or the first signal conditioner 220) is powered on. For example, the controller 140 may be configured to receive the trim calibration function 230 from the pressure sensor 200 (or the first signal conditioner 220) immediately, or soon after (e.g., after 1 second, 20 seconds, 60 seconds, 2 minutes, 5 minutes, 30 minutes, 1 hour, etc.), the pressure sensor 200 (or the first signal conditioner 220) is powered on. In some examples, the pressure sensor 200 is powered on at power on (e.g., key on, etc.) of the vehicle associated with the exhaust aftertreatment system 100.

Figure 10:
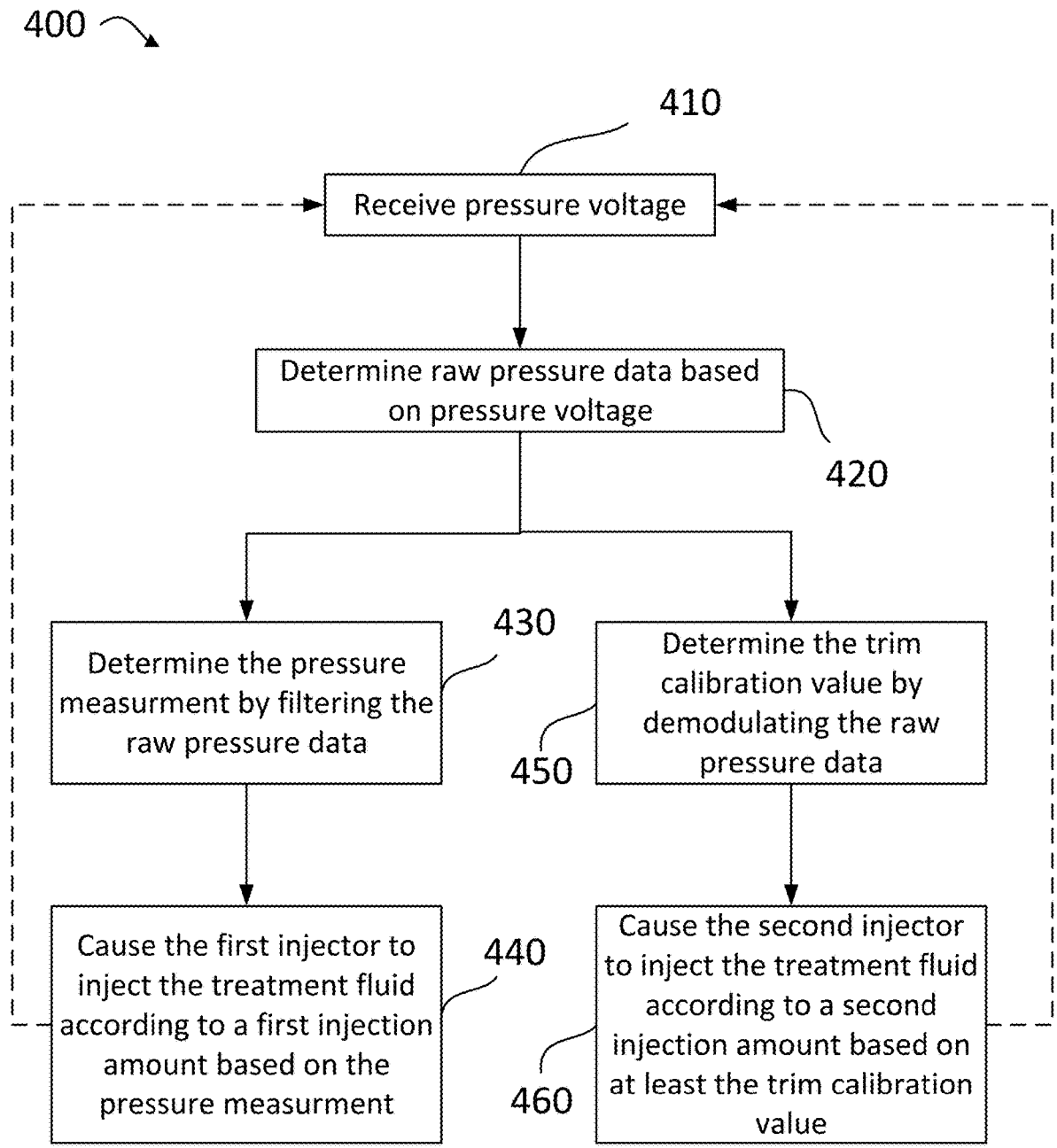
FIG. 10 illustrates a flow chart of a method for operating the controller.

FIG. 10 illustrates a flow chart of a method 400 for operating the controller 140, according to an embodiment. At 410, the controller 140 receives the pressure voltage 215 from the pressure sensor 200 (or the sensing element 210). At 420, the controller 140 determines raw pressure data based on the pressure voltage 215. In some embodiments, the raw pressure data includes the pressure measurement and a modulated trim. At 430, the controller 140 determines the pressure measurement by filtering the raw pressure data. For example, filtering the raw pressure data may include removing the modulated trim from the raw pressure data to determine the pressure measurement. In some embodiments, the filtering is performed using a first order discrete time first order filter. At 440, the controller 140 causes the first injector 118 to inject the treatment fluid according to a first injection amount, where the first injection amount is determined based on at least the pressure measurement. At 450, the controller 140 determines the trim calibration value by demodulating the raw pressure data. At 460, the controller 140 causes the second injector 155 to inject the treatment fluid according to a second injection amount, where the second injection amount is based on at least the trim calibration value. In some embodiments, the second injection amount is based on both the trim calibration value and the pressure measurement.

Figure 11:
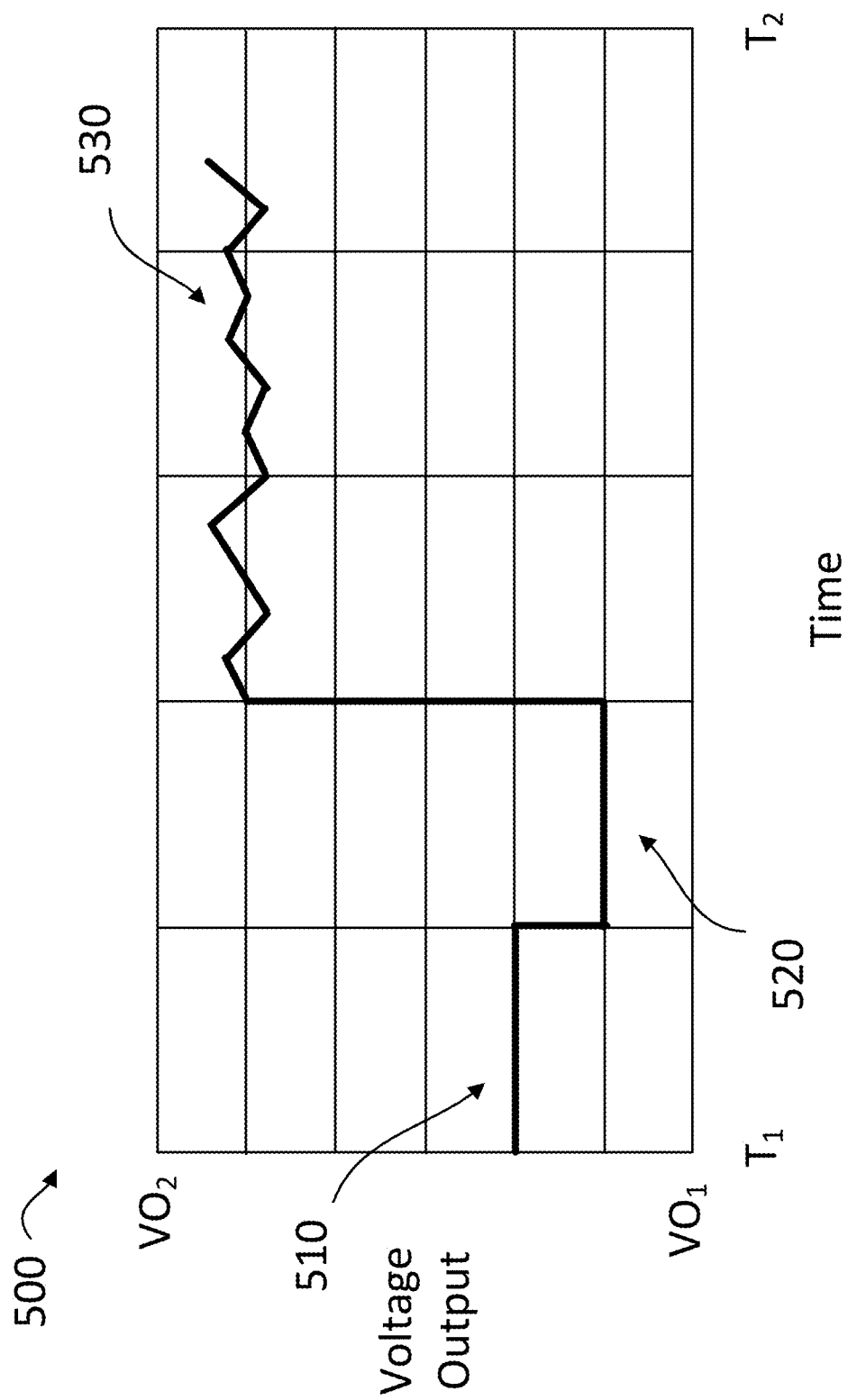
FIG. 11 illustrates a graph of a first pressure sensor voltage output over a period of time.

FIG. 11 illustrates a graph of a first pressure sensor voltage output 500 over a period of time, according to an embodiment. The first pressure sensor voltage output 500 may include a voltage output range of a first voltage output ($VO_1$) to a second voltage output ($VO_2$). The period of time of the first pressure sensor voltage output 500 may include a range of a first time ($T_1$) to a second time ($T_2$). The controller 140 is configured to receive the first pressure sensor voltage output 500 from the pressure sensor 200 (or the first signal conditioner 220). In some embodiments, after being powered on, the pressure sensor 200 (or the first signal conditioner 220) is configured to transmit the first pressure sensor voltage output 500 to the controller 140. The first pressure sensor voltage output 500 includes a first trim function value voltage 510 for a first time period. The controller 140 is configured to receive the first trim function value voltage 510 and determine a first trim function value based on the first trim function value voltage 510. In some embodiments, the first trim function value is equal to an offset value of the trim calibration function 230. In other embodiments, the first trim function value is equal to a slope value of the trim calibration function 230.

The first pressure sensor voltage output 500 further includes a second trim function value voltage 520 for a second time period, where the second time period is after the first time period. The controller 140 is configured to receive the second trim function value voltage 520 and determine a second trim function value based on the second trim function value voltage 520. In some embodiments, the second trim function value is equal to the slope value of the trim calibration function 230. In other embodiments, the first trim function value is equal to the offset value of the trim calibration function 230. The first pressure sensor voltage output 500 further includes first reading pressure voltages 530 associated with regular pressure readings. In some embodiments, the pressure sensor 200 (or the first signal conditioner 220) is configured to output the first reading pressure voltages 530 after outputting the first trim function value voltage 510 and the second trim function value voltage 520 (e.g., after the second time period).

Figure 12:
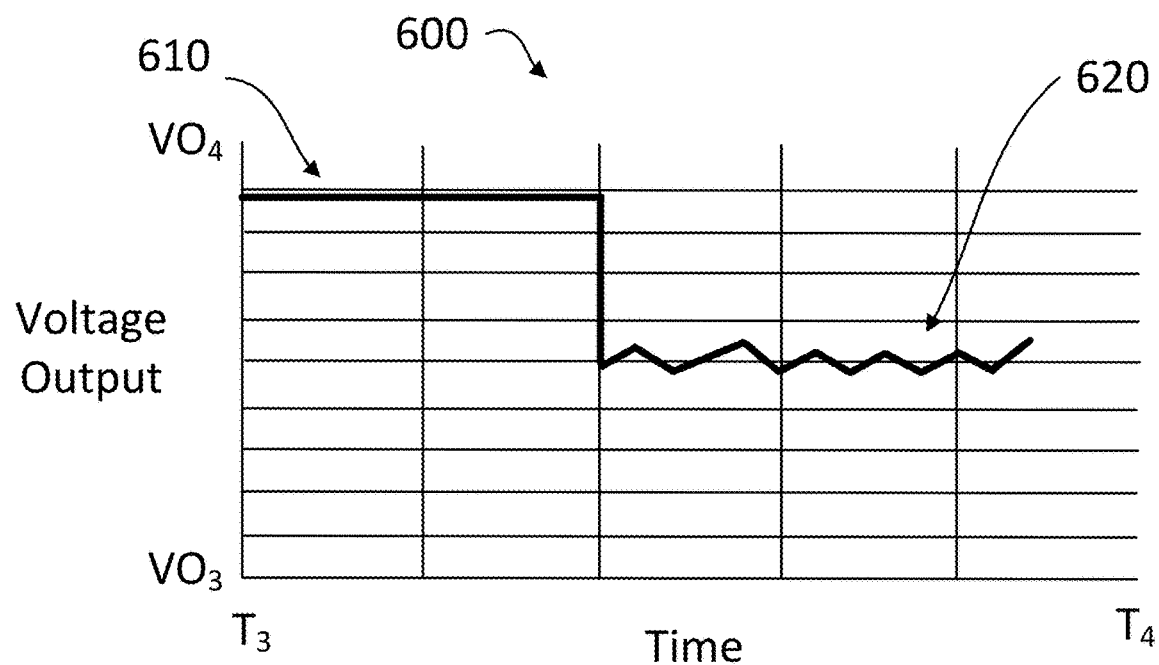
FIG. 12 illustrates a graph of a second pressure sensor voltage output over a period of time.

FIG. 12 illustrates a graph of a second pressure sensor voltage output 600 over a period of time, according to an embodiment. The second pressure sensor voltage output 600 may include a voltage output range of a third voltage output ($VO_3$) to a fourth voltage output ($VO_4$). The period of time of the second pressure sensor voltage output 600 may include a range of a third time ($T_3$) to a fourth time ($T_4$). The controller 140 is configured to receive the second pressure sensor voltage output 600 from the pressure sensor 200 (or the first signal conditioner 220). In some embodiments, after being powered on, the pressure sensor 200 (or the first signal conditioner 220) is configured to transmit the second pressure sensor voltage output 600 to the controller 140. The second pressure sensor voltage output 600 includes a calibration value voltage 610 for a predetermined time period. The controller 140 is configured to receive the calibration value voltage 610 from the pressure sensor 200. In some embodiments, the calibration value voltage 610 is associated with percent variation of nominal injector flow (e.g., +1%, −9%, etc.), volume variation of injection amount (e.g., +1 ml, −6 ml, etc.), mass variation of injection amount (e.g., +2 g, −4 g, etc.), or the like. The second pressure sensor voltage output 600 further includes second reading pressure voltages 620 associated with the regular pressure readings. In some embodiments, the pressure sensor 200 (or the first signal conditioner 220) is configured to output the second reading pressure voltages 620 after outputting the calibration value voltage 610 (e.g., after the predetermined time period).

Figure 13:
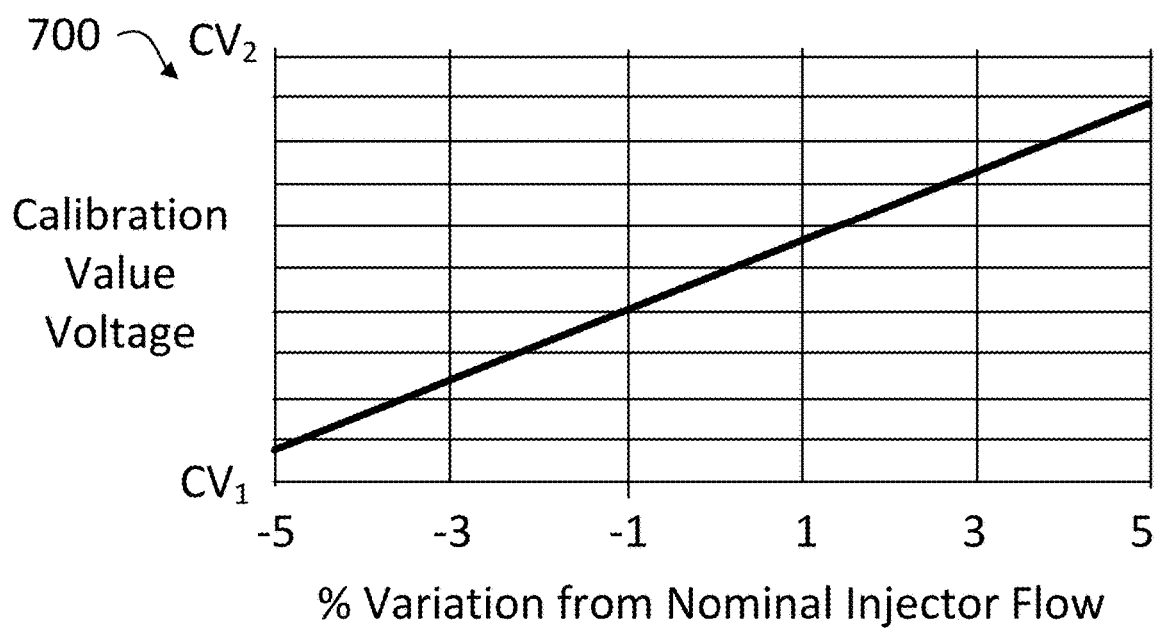
FIG. 13 illustrates a graph of a voltage calibration function defining a relationship between a percent variation from nominal injector flow and a calibration value voltage.

FIG. 13 illustrates a graph of a voltage calibration function 700 defining a relationship between a percent variation from nominal injector flow and a calibration value voltage (e.g., the calibration value voltage 610, etc.), according to an embodiment. The calibration value voltage of the voltage calibration function 700 may include a calibration voltage range of a first calibration voltage ($CV_1$) to a second voltage output ($CV_2$). The nominal injector flow may be associated with the injection amounts described herein. For example, the percent variation from the nominal injector flow may include, or be replaced by, a percent variation from the injection amount, a volume variation from the injection amount, a mass variation from the injection amount, or the like. In some embodiments, the controller 140 is configured to receive the calibration value voltage 610 from the pressure sensor 200 (or the first signal conditioner 220) and determine the percent variation from nominal injector flow based on the calibration value voltage 610 using the voltage calibration function 700.

In some embodiments, the controller 140 is configured to receive the pressure signal 222 (e.g., the untrimmed pressure signal) from the pressure sensor 200, determine the pressure measurement (e.g., the untrimmed pressure measurement) based on the pressure signal 222, determine a first injection amount based on at least the pressure measurement, and cause the first injector 118 to inject the treatment fluid according to the first injection amount. The controller 140 may be further configured to receive the pressure voltage 215, which includes the calibration value voltage 610, from the pressure sensor 200 (or the sensing element 210), determine a percent variation from nominal injector flow based on the calibration value voltage 610 using the voltage calibration function 700, determine a second injection amount based on the pressure measurement and the percent variation from nominal injector flow, and cause the second injector 155 to inject the treatment fluid according to the second injection amount.

IV. Configuration of Example Embodiments

As utilized herein, an area is measured along a plane (e.g., a two-dimensional plane, etc.) unless otherwise indicated. This area may change in a direction that is not disposed along the plane (e.g., along a direction that is orthogonal to the plane, etc.) unless otherwise indicated.

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "configured to receive exhaust from," "configured to receive air from," "configured to receive treatment fluid from," and the like, as used herein, mean the two components or objects have a pathway formed between the two components or objects in which a fluid, such as air, treatment fluid, a treatment fluid-air mixture, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. A controller for an exhaust aftertreatment system, the controller configured to:
   receive a pressure signal from a pressure sensor, the pressure sensor configured to generate the pressure signal based on a pressure of treatment fluid in a downstream dosing module;
   determine a pressure measurement based on the pressure signal;
   determine a first injection amount based on the pressure measurement;
   cause an upstream injector of an upstream dosing module to inject the treatment fluid according to the first injection amount;
   determine a second injection amount based on the pressure measurement and a resistance of a variable resistor; and
   cause a downstream injector of the downstream dosing module to inject the treatment fluid according to the second injection amount.

2. The controller of claim 1, wherein the controller is further configured to:
   receive an electrical charge from the variable resistor; and
   determine the resistance of the variable resistor based on the electrical charge.

3. The controller of claim 2, wherein the controller is further configured to:
   determine an electrical current of the electrical charge;
   retrieve a fixed voltage value; and
   determine the resistance of the variable resistor based on the electrical current and the fixed voltage value.

4. The controller of claim 3, wherein the fixed voltage value is a voltage amount used by the variable resistor.

5. The controller of claim 1, wherein the controller is configured to receive the pressure signal from a signal conditioner of the pressure sensor, the signal conditioner configured to receive a pressure voltage from a sensing element of the pressure sensor and output the pressure signal.

6. The controller of claim 1, wherein:
   the variable resistor is a first variable resistor; and
   the controller is further configured to determine the first injection amount based on the pressure measurement and a resistance of a second variable resistor selectively switchable between multiple resistances.

7. An exhaust aftertreatment system comprising:
   a pressure sensor comprising:
      a sensing element configured to provide a pressure voltage based on a pressure of treatment fluid in a downstream dosing module,
      a first signal conditioner electrically coupled to the sensing element and configured to receive the pressure voltage from the sensing element and output a pressure signal, and
      a second signal conditioner electrically coupled to the sensing element and configured to receive the pressure voltage from the sensing element, determine a trim calibration value based on a trim calibration function and the pressure voltage, and output a trimmed pressure signal, wherein the trimmed pressure signal is determined based on the pressure voltage and the trim calibration value; and
   a controller electrically coupled to the pressure sensor, the controller configured to:
      receive the pressure signal and the trimmed pressure signal from the pressure sensor,
      determine a pressure measurement based on the pressure signal,
      determine a first injection amount based on the pressure measurement,
      cause an upstream injector of an upstream dosing module to inject the treatment fluid according to the first injection amount,
      determine a trimmed pressure measurement based on the trimmed pressure signal,
      determine a second injection amount based on the trimmed pressure measurement, and
      cause a downstream injector of the downstream dosing module to inject the treatment fluid according to the second injection amount.

8. A controller for an exhaust aftertreatment system, the controller configured to:
   receive a pressure signal from a pressure sensor, the pressure sensor configured to provide the pressure signal based on a pressure voltage that is based on a pressure of treatment fluid in a downstream dosing module;
   determine a pressure measurement based on the pressure signal;
   determine a first injection amount based on the pressure measurement;
   cause an upstream injector of an upstream dosing module to inject the treatment fluid according to the first injection amount,
   receive the pressure voltage from the pressure sensor;
   determine a trim calibration value based on a trim calibration function and the pressure voltage;
   determine a second injection amount based on the pressure measurement and the trim calibration value; and
   cause a downstream injector of the downstream dosing module to inject the treatment fluid according to the second injection amount.

9. The controller of claim 8, wherein the controller is configured to receive the pressure signal from a signal conditioner of the pressure sensor, the signal conditioner configured to receive the pressure voltage from a sensing element of the pressure sensor and output the pressure signal.

10. The controller claim 8, comprising a memory, wherein the controller is further configured to receive at least one of the pressure voltage or the pressure signal from the pressure sensor after the trim calibration function is stored in the memory.

11. The controller of claim 8, wherein the controller is further configured to receive the trim calibration function from the pressure sensor.

12. The controller of claim 8, wherein the controller is configured to receive the trim calibration function from the pressure sensor after the pressure sensor is powered on.

13. The controller of claim 12, wherein the controller is configured to, after the pressure sensor is powered on:
   receive, from the pressure sensor, a first trim function value voltage for a first time period; and
   determine a first trim function value based on the first trim function value voltage.

14. The controller of claim 13, wherein the controller is configured to, after the pressure sensor is powered on:

receive, from the pressure sensor, a second trim function value voltage for a second time period after the first time period; and determine a second trim function value based on the second trim function value voltage.

15. The controller of claim 14, wherein the first trim function value is equal to an offset value of the trim calibration function and the second trim function value is equal to a slope value of the trim calibration function.

16. The controller of claim 14, wherein the controller is configured to receive the pressure signal from the pressure sensor after the second time period.

17. The controller of claim 8, wherein the controller is further configured to determine raw pressure data based on the pressure voltage, and wherein determining the pressure measurement comprises filtering the raw pressure data.

18. The controller of claim 17, wherein the raw pressure data comprises the pressure measurement and a modulated trim, and wherein filtering the raw pressure data comprises removing the modulated trim from the raw pressure data.

19. The controller of claim 18, wherein the filtering is performed using a first order discrete time first order filter.

20. The controller of claim 8, wherein the controller is further configured to determine raw pressure data based on the pressure voltage, and wherein determining the trim calibration value comprises demodulating the raw pressure data.

\* \* \* \* \*